(12) United States Patent
Venkateswarulu et al.

(10) Patent No.: US 10,275,305 B2
(45) Date of Patent: Apr. 30, 2019

(54) EXPERT SYSTEM AND DATA ANALYSIS TOOL UTILIZING DATA AS A CONCEPT

(71) Applicant: Datavore Labs Inc., New York, NY (US)

(72) Inventors: Sanjay Venkateswarulu, Jersey City, NJ (US); Jake Perlman-Garr, New York, NY (US)

(73) Assignee: Datavore Labs, Inc., New York, NY (US)

( * ) Notice: Subject to any disclaimer, the term of this patent is extended or adjusted under 35 U.S.C. 154(b) by 675 days.

(21) Appl. No.: 14/934,246

(22) Filed: Nov. 6, 2015

(65) Prior Publication Data

US 2016/0148118 A1 May 26, 2016

Related U.S. Application Data

(60) Provisional application No. 62/084,430, filed on Nov. 25, 2014.

(51) Int. Cl.
*G06F 11/07* (2006.01)
*G06F 11/30* (2006.01)
*G06Q 10/10* (2012.01)

(52) U.S. Cl.
CPC .......... *G06F 11/0793* (2013.01); *G06F 11/30* (2013.01); *G06Q 10/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,229,995 B2* | 1/2016 | Sekharan | ............ | G06F 17/3089 |
| 9,536,096 B2* | 1/2017 | MacAulay | ............. | G06F 21/60 |
| 9,582,475 B2* | 2/2017 | Sekharan | ............ | G06F 17/2264 |
| 2014/0172885 A1* | 6/2014 | Sekharan | ............ | G06F 17/3089 |
| | | | | 707/755 |
| 2014/0173411 A1* | 6/2014 | Sekharan | ............ | G06F 17/2264 |
| | | | | 715/234 |

(Continued)

OTHER PUBLICATIONS

Hal-Lirmm, Datavore: A Vocabulary Recommender Tool, Assisting Linked Data Modeling, Mohamed Ben Elle, Zohra Bellahsene, Konstantin Todorov, LIRMM / University of Montpellier, France, Submitted on Dec. 5, 2016.*

(Continued)

*Primary Examiner* — Michael B Holmes
(74) *Attorney, Agent, or Firm* — Dilworth Paxson LLP; Edward F. Behm, Jr.

(57) ABSTRACT

Methods and systems are provided for a tool that operates on a local user machine that is coupled to a remote storage. Data may be aggregated by the tool by combining raw data from multiple sources with different file types, where the data is stored in remote storage. Concepts and relationships existent within the inputted/loaded data may be learned by the tool. The data may be reconciled using the tool by a process of data scrubbing. The data may be analyzed using data manipulation techniques and statistical analysis. The work data flow from the data analysis may be captured by the tool and stored in the remote storage for later use. Visualizations (e.g., charts and graphs) may be generated by the tool for the analyzed data.

20 Claims, 30 Drawing Sheets

(56) References Cited

U.S. PATENT DOCUMENTS

| | | | | |
|---|---|---|---|---|
| 2014/0173412 | A1* | 6/2014 | MacAulay | G06F 21/60 715/234 |
| 2015/0052162 | A1* | 2/2015 | Arnold | G06F 17/30699 707/756 |
| 2015/0278286 | A1* | 10/2015 | Arnold | G06F 17/30699 707/741 |
| 2016/0148118 | A1* | 5/2016 | Venkateswarulu | G06F 11/0793 706/12 |
| 2018/0165336 | A1* | 6/2018 | Venkateswarulu | G06F 11/30 |

OTHER PUBLICATIONS

ACM Digital Library (DL),Towards a Vocabulary Terms Discovery Assistant, Ioannis Stavrakantonakis, Anna Fensel, Dieter Fensel, University of Innsbruck, STI Innsbruck, SEMANTiCS 2016 Sep. 12-15, 2016, Leipzig, Germany, 2016 ACM ISBN 978-1-4503-4752-May 16, 2009, pp. 181-1184.*

The Reliability of Concept Mapping, William M.K. Trochim, Cornell University, Annual Conference of the American Evaluation Association, Dallas, Texas, Nov. 6, 1993 pp. 1-11.*

IEEE Transactions on Systems, Man, and Cybernetics—Part C: Applications and Reviews, vol. 42, No. 2, Mar. 2012 Learning Algorithms for Fuzzy Cognitive Maps-A Review Study, Elpiniki I. Papageorgiou, pp. 150-163.*

Education Tech Research Dev (2008) pp. 203-228 Environmental Detectives—the development of an augmented reality platform for environmental simulations, Eric Klopfer, Kurt Squire SpringerLink.*

Elsevier Pervasive and Mobile Computing 6 (2010) pp. 161-180 Pervasive and Mobile Computing A survey of context modelling and reasoning techniques, Claudio Bettini, Oliver Brdiczka, Karen Henricksen, Jadwiga Indulska, Daniela Nicklas, Anand Ranganathanf, Daniele Riboni.*

* cited by examiner

EXPERT SYSTEM AND DATA ANALYSIS TOOL UTILIZING DATA AS A CONCEPT

CROSS REFERENCE TO RELATED APPLICATIONS

This application claims the benefit of and/or the right of priority to U.S. Provisional Application No. 62/084,430, entitled "Expert System And Data Analysis Tool Utilizing Data As A Concept," filed Nov. 25, 2014, which is hereby incorporated by reference in its entirety.

TECHNICAL FIELD

Various embodiments of the present invention generally relate to data as a concept and related systems and methods. More specifically, various embodiments of the present application relate to systems and methods allowing for the creation of dynamic data relationships and utilizing data as a concept normalization algorithms, tracking analysis of the data, and visualizing the analyzed data.

BACKGROUND

Data analysis experts that are tasked with analyzing big data sets (e.g. to build complex predictive models) do not always have domain expertise to know the goals of data analysis and what measurements to take relating to the data sets. Data analysis experts need a tool that ensures accuracy and completeness in their data, a tool to allow discovery and classification of their data, a tool to conduct what-if analysis on the data, and a tool to determine trends and outliers in the data. More specifically, a tool providing superior data quality is needed where information is often siloed and existing in multiple locations and in different formats. In addition, a tool providing an understanding of different data types across multiple data sets and the relationships between the different data types is needed. Additionally, a tool with the ability to conduct deep analytical dives into consolidated data sets to discover actionable insights is needed. As such, there is a need for a tool to aggregate data, reconcile it, analyze the data, and visualize the data rapidly. Such data analysis may be an iterative process with visualizations that may allow for further analysis.

SUMMARY

Various embodiments of the present invention generally relate to data as a concept and related systems and methods. In particular, systems and methods are disclosed that allow for the aggregation, reconciliation, analysis, and visualization of data in a unitary end-to-end tool. In some embodiments, the tool, which may also be referred to herein as a platform, may be called Datavore. The tool may be used to automatically learn concepts and relationships existent within big data sets. For example, the tool may be used to aggregate data by a process of ingesting and combining raw data from multiple sources with different file types. As another example, the tool may be used to reconcile the data by scrubbing "messy" (e.g., noisy data) data to produce high quality data that permits better aggregation and analysis of the data. As yet another example, the tool may be used to analyze the data by using multiple data manipulation techniques (e.g., "Excel-like" data manipulation techniques) and statistical analysis to allow for better data discovery. As yet another example, the tool may be used to visualize the data by using dynamic graphs and charts to illustrate key relationships and trends within the data. As yet a further example, the tool may be used to export data, meta-data, or visualizations to other tools, programs, and/or modules. In some embodiments, the tool may be an end-to-end Software as a Service (SaaS) solution that allows data analysis experts to easily conduct complex analysis on big data sets. In some embodiments the tool may act as a Master Data Management tool that includes reference data and analytical data to be an authoritative source of master data. In such embodiments, the tool may operate to reconcile data by removing duplicate and/or incorrect data and automatically generating rules to prevent such data from entering the system or any data analysis step.

Such a tool may be streamlined and may offer several advantages due to its ability to learn concepts and relationships within big data sets. For example, the tool may allow for a user-defined world in which domain expertise is captured to make appropriate "apples-to-apples" comparisons between similar types of data, from the user's perspective. As another example, the tool may allow for superior analysis of data by conducting customized statistical and predictive analysis of financial and market data. As yet another example, the tool may allow for data curation by cleaning and integrating disparate, messy, or syntactically different data sets. As yet another example, the tool may allow for "smart" visualizations of the data by automatically creating graphs and charts to show the most important relationships between similar and/or different data including magnitudes, relations and allowing for trend and outlier detection. As a further example, the tool may have an intuitive interface that is simple and seamless to the user because it does not involve computer programming, creation of macros, or cryptic database queries.

A particular example of the use of the Datavore tool includes industry comparables analysis on financial data. The tool may be used to aggregate multiple financial statements that may be siloed in, e.g., Bloomberg, and/or CapIQ, and/or other data sources. The tool may be used to reconcile the data by quickly creating "apples-to-apples" comparisons of related or similar companies' financials, the comparisons may include industry Key Performance Indicators (KPI's) from the relevant industries. The tool may be used to analyze the data by comparing performance of a company with data analysis expert defined specification and metrics. The work data flow (the step-by-step procedure by which the data is manipulated in order to analyze the data) may be used by the data analysis expert to analyze the data. The analysis may include filtering and grouping the data (e.g., in accordance with the industries in which the company operates). The work data flow may be stored by the tool for later use. For example, the stored work data flow may be used for automation of analysis on different data, portability of data analysis techniques, or as one or more building blocks for additional data analysis. This work data flow and other work data flows created by a user of the tool, in conjunction with learned concepts, may be considered the user's lens with respect to viewing/analyzing particular types of data. The tool may be used to visualize the data by simultaneously viewing company financials and KPI's over time and across the industries in which the company operates. During visualization, outliers and trends may be recognized by the tool. For example, for the use case of multi-strategy and long short equities hedge funds, the tool may allow for a holistic industry review, industry comparables analysis, simulated portfolio performance, and macro data correlations. As another example, for the use case of fixed income and real estate hedge funds, the tool may allow for bond data cleaning, capital structure assessments, complex financial instrument analysis, and merger ramifications.

The Datavore tool, described herein, may be able to learn concepts and relationships associated with different data types to simplify the analysis of the data and to allow data analysis experts to more efficiently work with the data. The tool may be able to combine the learned concepts and relationships with user defined concepts and relationships associated with the different data types.

In some embodiments a tool may operate on a local user machine that is coupled to a remote storage. Data may be aggregated by the tool by combining raw data from multiple sources with different file types, where the data is stored in remote storage. Concepts and relationships existent within the inputted/loaded data may be learned by the tool. The data may be reconciled using the tool by a process of data scrubbing. The data may be analyzed using data manipulation techniques and statistical analysis. The work data flow from the data analysis may be captured by the tool and stored in the remote storage for later use. Visualizations (e.g., charts and graphs) may be generated by the tool for the analyzed data. In some embodiments, the visualizations may automatically identify key relationships and trends within the data. In some embodiments aspects of the visualizations may be selected and the data may be filtered based on the selected aspects of the visualizations.

In some embodiments, a user of the tool may request the output of a specific step in a work data flow using a user interface. A flow processor may look up access permissions and retrieve metadata about the work data flow from a flow store. A flow execution planner may determine the dependent steps required to execute user requests and may generate an execution plan (e.g., an execution plan that defines what data, from where, and what transformations are needed for the data). A query generator may convert the execution plan into an execution against a data store(s). A results visualizer may be able to collect data and generate charts to display to the user of the tool. In some embodiments, the results visualizer may be able to display magnitudes, relations, and trends of requested data on-demand.

In some embodiments, a user of the tool may perform an action to create, update, or modify a work data flow using a user interface. A flow processor may look up access permissions and retrieve metadata about the work data flow from a flow store. A flow validator may check the dependencies between steps in the work data flow. For example, the flow validator may be able to validate that no cyclical dependencies exist between the steps and may be able to confirm that all inputs that are needed by each step are accessible. If the flow validator determines that there is an error in the dependencies in the work data flow, it may notify the user interface and cause it to display an error notification to the user. A user may save a work data flow using the user interface and the work data flow may be stored in the flow store with any required access permissions.

In some embodiments, a user of the tool may request a work data flow and/or data/datasets to be synced/saved to a server (e.g., to facilitate backup and sharing) using a user interface and via a work data flow browser and/or a dataset browser. The flow browser may access a local flow store and/or a remote flow store(s) to check permissions and versions and updates of a work data flow to be synced/saved. The flow browser may communicate with the remote flow store(s) to sync/save the work data flow identified to be synced/saved. The dataset browser may access a local data store and/or a remote data store(s) to check permissions and versions and updates of data and/or data sets to be synced/saved. The dataset browser may communicate with the remote data store(s) to sync/save the data and/or data sets identified to be synced/saved.

The user of the tool may request a work data flow and/or data/datasets to be retrieved from a server using the user interface and via the work data flow browser and/or the dataset browser. The flow browser may access the local flow store and/or the remote flow store(s) to check permissions and versions and to ensure that the version of a requested work data flow are up to date. The flow browser may communicate with the remote flow store(s) to retrieve the work data flow requested. The dataset browser may access the local data store and/or the remote data store(s) to check permissions and versions and to ensure that the version of requested data and/or data sets are up to date. The dataset browser may communicate with the remote data store(s) to retrieve the data/datasets requested.

In some embodiments a user context mapping module may be used, e.g., by a user of the tool, to specify a particular "context" to which a data concept belongs. A syntax and semantic reconciliation module may automatically attempt to correct spelling errors such as small typos (string distance/n-grams), sounds-like corrections, and may perform language normalization. The syntax and semantic reconciliation module may automatically attempt to map labels in the data (associated with the data concepts in, e.g., a data set) to universal identifiers stored, e.g., in a remote data store(s). The user may be presented the matches that result from the operation of the syntax and semantic reconciliation module. The user can disambiguate items based on, e.g., a confidence score associated with a particular one of the matches. The user's actions may be stored in a context mapping memory module to assist in future mapping of the same data concept.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings.

FIGS. 2-22, and 27-29 may be screenshots of a display that is coupled to a system that may be similar to what is described with respect to FIG. 30. These screenshots depict various aspects of the tool described herein. The screenshots and/or drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and screenshots and are described in detail below. The intention, however, is not to limit the invention to the particular embodiments described. On the contrary, the invention is intended to cover all modifications, equivalents, and alternatives falling within the scope of the invention as defined by the subsequently appended claims.

DETAILED DESCRIPTION

Various embodiments of the present invention are directed to methods and systems for learning concepts and relationships associated with different data to simplify the analysis of the data, tracking and storing the analysis techniques used to manipulate the data, and visualizing and filtering the analyzed data. In particular, the Datavore tool, described herein, may be able to learn concepts and relationships associated with different data types to simplify the analysis of the data and to allow data analysis experts to more efficiently work with the data. The tool may be able to combine the learned concepts and relationships with user defined concepts and relationships associated with the different data types. The tool may be able to track and the data analysis experts' data analysis techniques (work data flows). The tool may also allow for the visualization and filtering of the analyzed data. Although multiple references are made herein to a user (e.g., data analysis expert) of a tool, the tool may be operated by an organization, or may operate automatically without departing from the scope and spirit of the present disclosure.

In the following description, for the purposes of explanation, numerous specific details are set forth in order to provide a thorough understanding of embodiments of the present invention. It will be apparent, however, to one skilled in the art that embodiments of the present invention may be practiced without some of these specific details. Having described embodiments of the present invention generally, attention is directed to FIG. 1.

Figure 1:
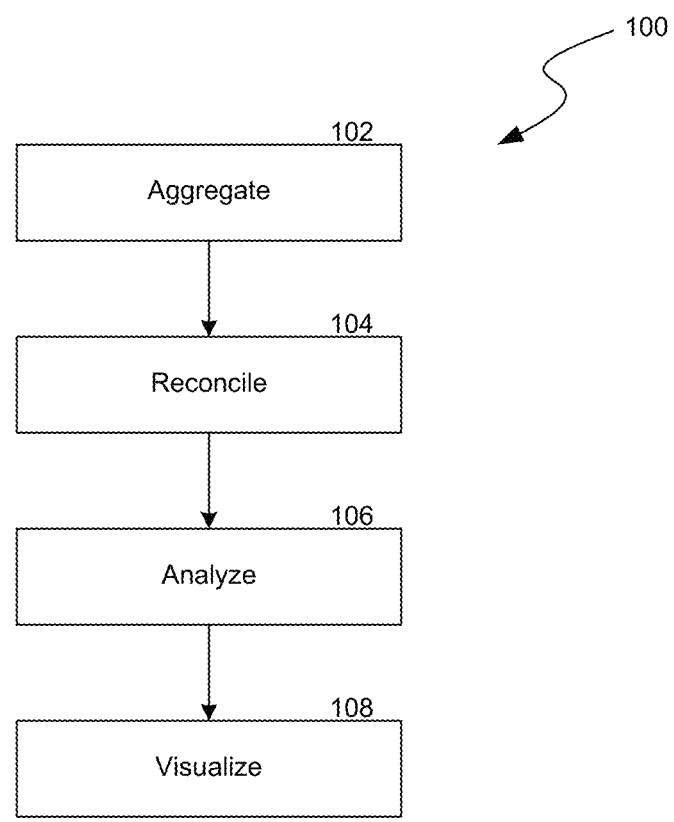
FIG. 1 is a flow chart illustrating a set of end-to-end data operation capabilities of the tool in accordance with some embodiments of the present invention.

FIG. 1 is flow chart 100 illustrating a set of end-to-end data operation capabilities of the tool in accordance with some embodiments of the present invention. Flow chart 100 includes 102, 104, 106, and 108. At 102, the tool may be used to aggregate data by a process of ingesting and combining raw data from multiple sources with different file types. In some embodiments, at 102, the tool may be used to automatically learn concepts and relationships existent within the inputted/loaded data. In some embodiments, at 102, the tool may be used to learn concepts and relationships existent within the inputted/loaded data via user defined parameters or input.

At 104, the tool may be used to reconcile the data by scrubbing messy data to produce high quality data that permits better aggregation and analysis of the data.

At 106, the tool may be used to analyze the data by using multiple data manipulation techniques (e.g., "Excel-like" data manipulation techniques) and statistical analysis to allow for better data discovery. The work data flow (the step-by-step procedure by which the data is manipulated in order to analyze the data) may be used by the data analysis expert to analyze the data. The work data flow may be stored by the tool for later use. For example, the saved work data flow may be used for automation of analysis on different data, portability of data analysis techniques, or as one or more building blocks for additional data analysis.

At 108, the tool may be used to visualize the data by using dynamic graphs and charts to illustrate key relationships and trends within the data. In some embodiments, the tool may be an end-to-end Software as a Service (SaaS) solution that allows data analysis experts to easily conduct complex analysis on big data sets.

It should be understood that the any of the steps/functions/operations/modules described herein with reference to any of the figures of the present disclosure may be executed or performed in any order or sequence not limited to the order and sequence shown and described in the figures. Additionally, some of the steps/functions/operations/modules may be executed or performed substantially simultaneously where appropriate or in parallel to reduce latency and processing times.

Figure 2:
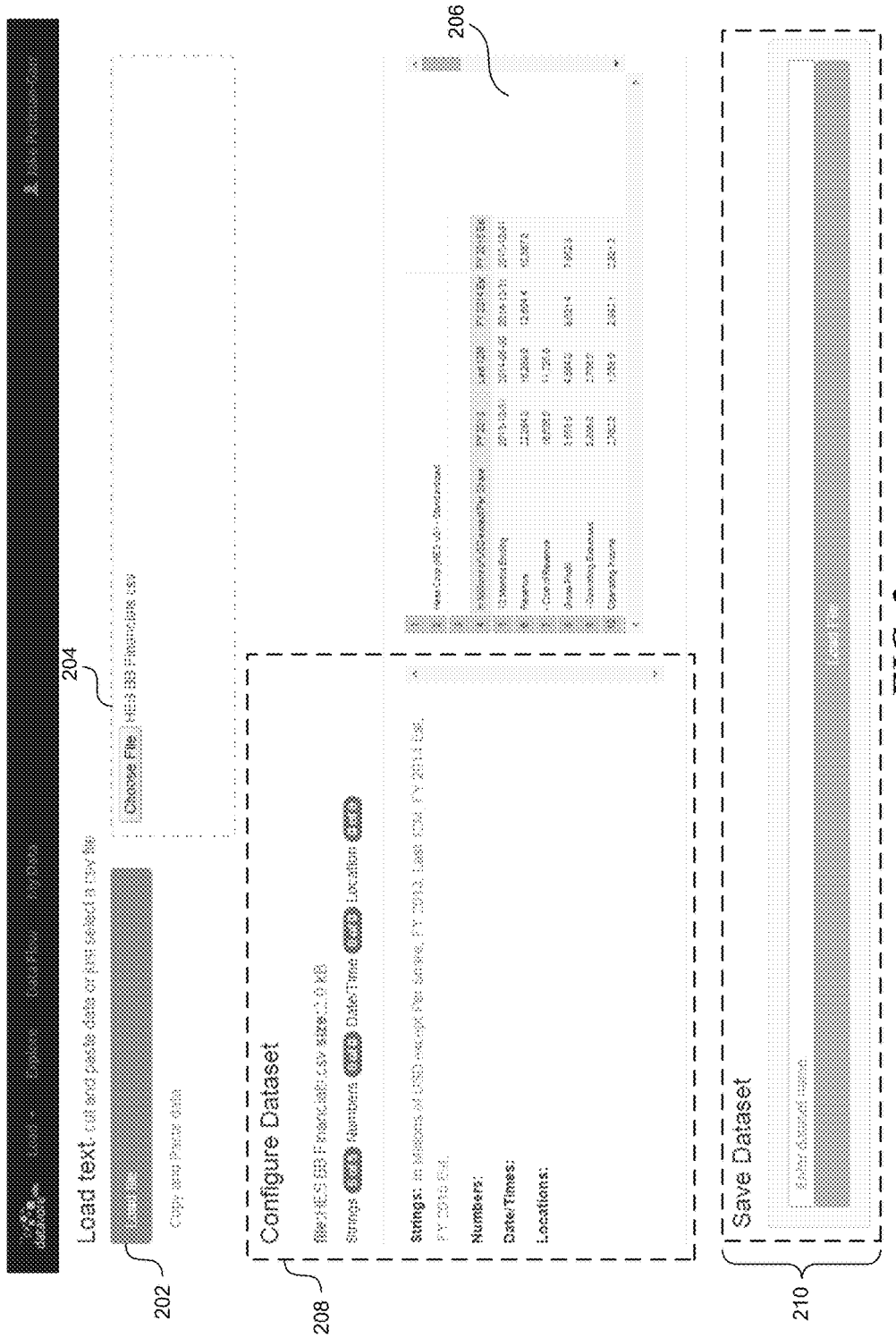
FIG. 2 illustrates an example of a first data ingestion capability of the tool in which some embodiments of the present invention may be utilized.

FIG. 2 illustrates an example of a first data ingestion capability of the tool in which some embodiments of the present invention may be utilized. In FIG. 2, a file may be loaded using load file choice area 202 and by choosing or inputting file(s) to load via user input area 204. The file that is loaded may be of any suitable file type for data, including but not limited to .csv, .xls, .rtf, etc. The data from the file may be loaded from any storage device, database(s), and/or input device. The file(s) that are loaded may be shown in area 206. Area 208 may identify different fields in the loaded files as being associated with a particular data type. Example data types may be strings, numbers, date and/or times, and/or locations, and/or other general categories of numbers, alpha-numerals, or other similar formats of data. The identification of fields may be automatic or may be user-defined. Input area 210 may be used, by an user, to save any of the data processed and/or input into the tool. As an example, FIG. 2 shows a financial file loaded into the tool.

Figure 3:
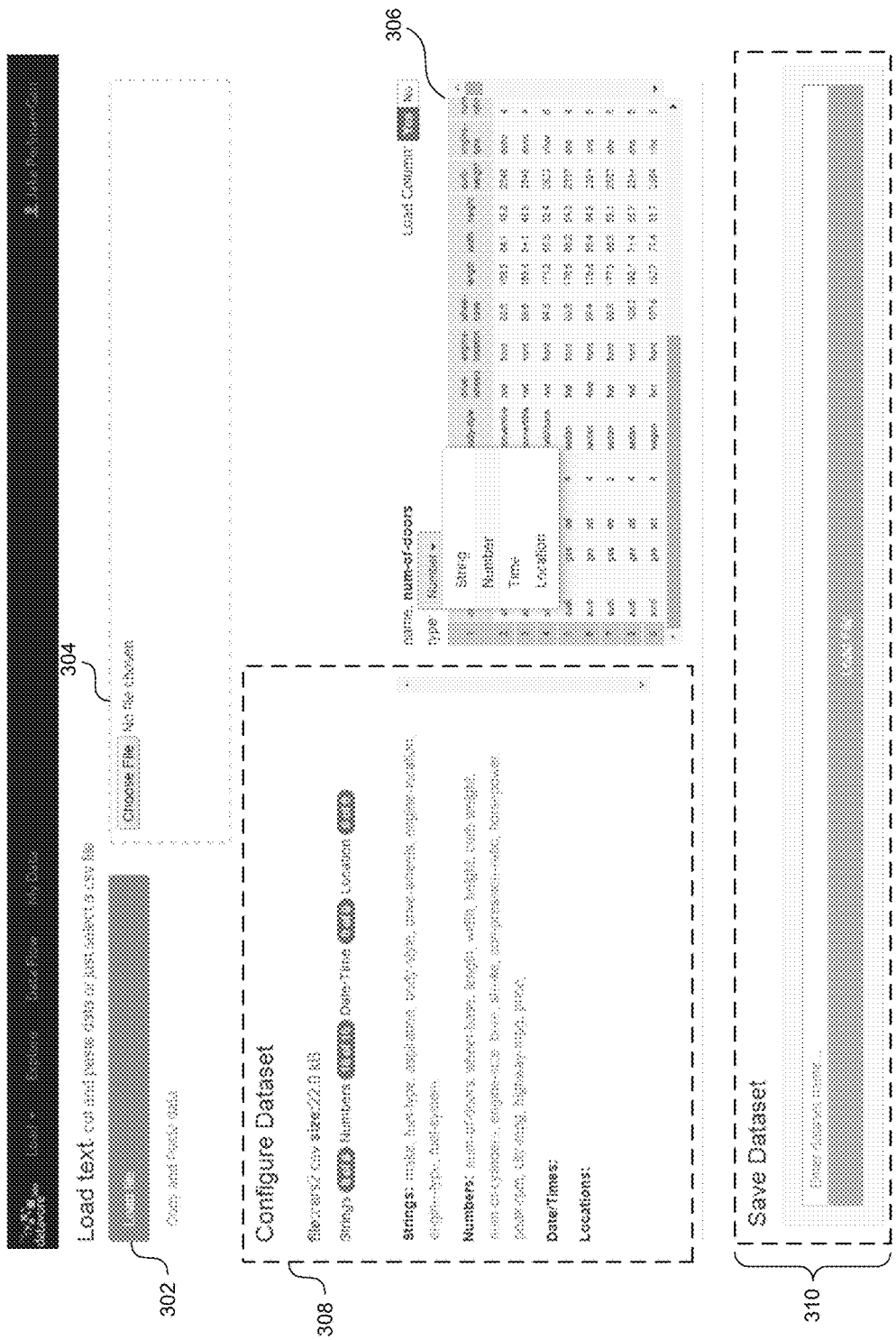
FIG. 3 illustrates an example of a second data ingestion capability of the tool in which some embodiments of the present invention may be utilized.

FIG. 3 illustrates an example of a second data ingestion capability of the tool in which some embodiments of the present invention may be utilized. In FIG. 3, areas 302, 304, 306, 308, and 310, may be substantially similar in form and function to areas 202, 204, 206, 208, and 210, respectively. Area 306 of FIG. 3 shows that an end user can categorize particular fields of the input data in the loaded data files as being of a particular data type (such as the data types as described above or as seen in area 308). As an example, FIG. 3 shows a file related to vehicle data that has been loaded into the tool, and the ability of the tool to allow a user to associate the "num-of-doors" field in the vehicle data file with the data type of "Number."

Figure 4:
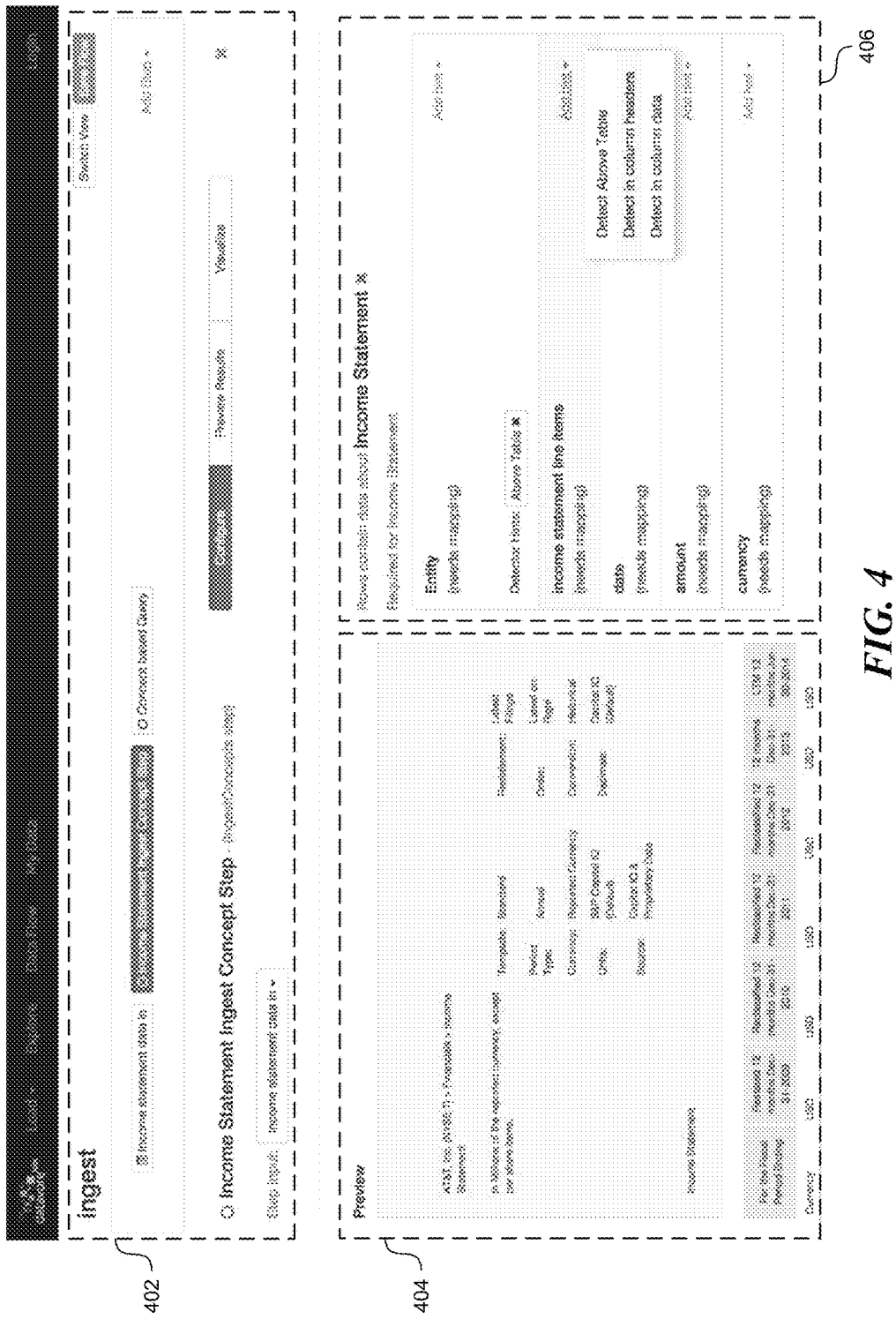
FIG. 4 illustrates an example of a concept ingestion capability of the tool in which some embodiments of the present invention may be utilized.

FIG. 4 illustrates an example of a concept ingestion capability of the tool in which some embodiments of the present invention may be utilized. In FIG. 4, a file may be loaded using load file choice area 402 and by choosing or inputting file(s) to load in that area. The file that is loaded may be of any suitable file type for data, including but not limited to .csv, .xls, .rtf, etc. The data from the file may be loaded from any storage device, database(s), and/or input device. Alternatively, area 402 may be used to specify the data on which the concept ingestion operation of the tool is to operate. For example, a data set may have already been loaded into the tool previously, an area 402 may be used by an user to identify the particular pre-loaded data on which concept ingestion will operate. Data preview area 404, shows a preview of the data that is identified in area 402. For example, data preview area 404 may show an income statement of a company. Data mapping area 406 may be used to map different items within the data that is identified in area 402 and possibly shown in area 406. Data mapping area 406 may be used to automatically map data concepts to the data that is identified in area 402. For example, the header information in an income statement can be one concept that can be automatically searched out, detected, identified, parsed, and/or syntactically corrected in the data. Other operations may also be automatically performed on the data concepts that are searched out. As other examples: key dates, key amounts, and currency types may be other types of data concepts that are mapped. Data mapping area 406 may allow for user input hints to facilitate the mapping of data concepts to the data in identified area 402 in an expedited fashion. For example, hints may be provided (or chosen) by a user to locate a particular data concept, such as look for the data concept in the header information. As another example of a hint the user can ask the tool to find the data concept in one of the column headers of the income statement or in the column data of the income statement, where the column headers are above the table in the income statement. Using this technique may facilitate a faster mapping between data concepts and the data identified in area 402.

Figure 5:
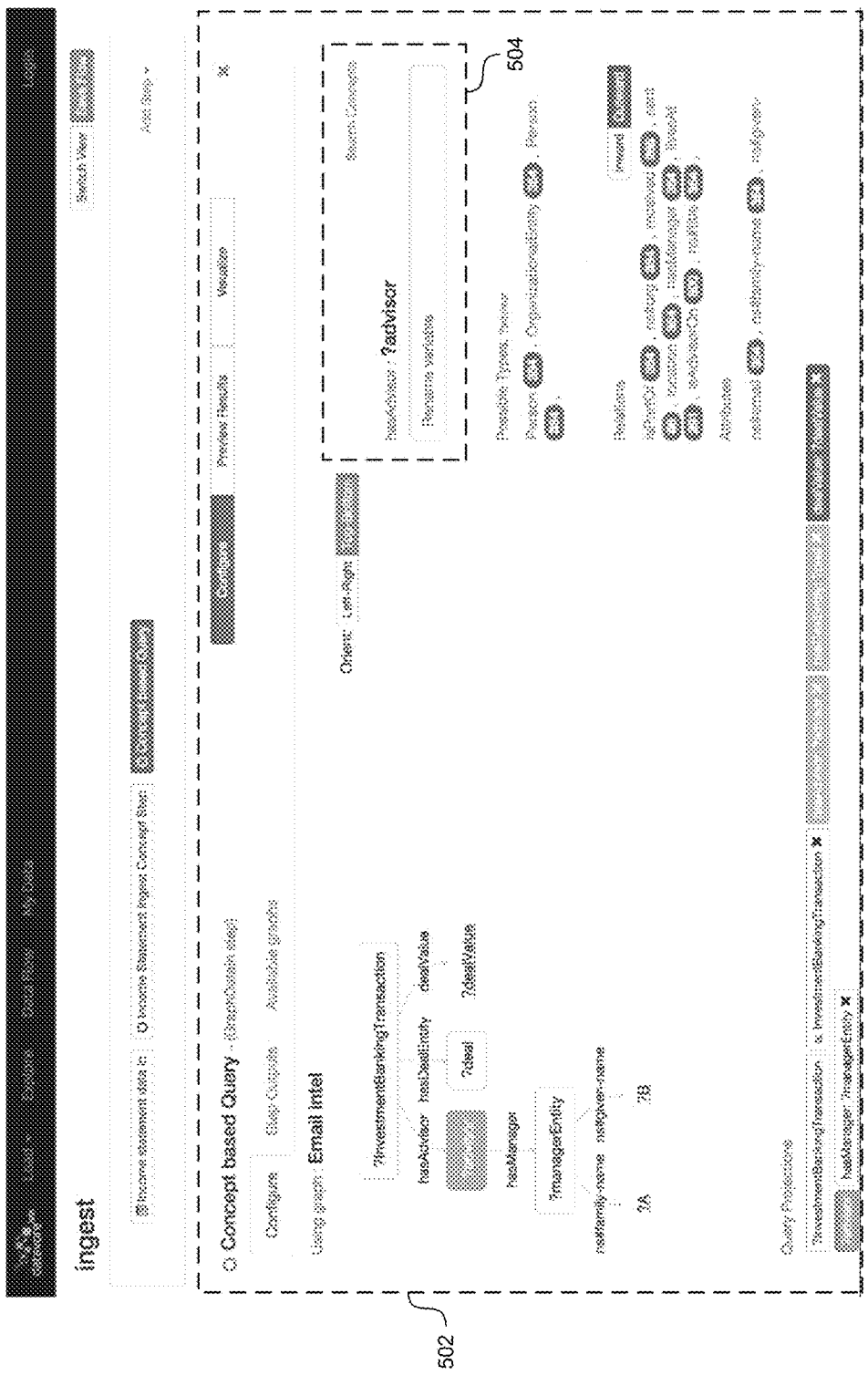
FIG. 5 illustrates an example of a concept mapping capability of the tool in which some embodiments of the present invention may be utilized.

FIG. 5 illustrates an example of a concept mapping capability of the tool in which some embodiments of the present invention may be utilized. In FIG. 5, concept query area 502 allows a user to query, using a graph based approach, any data set(s) that have been input or loaded into the tool. In particular, data concepts are presented to the user in a graph format in which nodes are different data concepts and interrelated data concepts are connected by an edge. A user may query the data set(s) using the graph to identify particular data concepts in which the user is interested. As a result of the query, the data set(s) may be filtered according to the particular data concepts included in the user's query. In some embodiments, the graph format may be a tree of interrelated concepts. In some embodiments, the tree may be displayed to the user in a top-to-bottom tree orientation format. In some embodiments, the tree may be displayed to the user in a left-to-right tree orientation format. The user may be able to select between a top-to-bottom orientation format or a left-to-right orientation format for the tree. A user may be able to zoom in or out on the tree. Area 504 of FIG. 5 may allow the user to rename the data concepts identified within the data set (e.g., via concept mapping as described with reference to FIG. 4).

Figure 6:
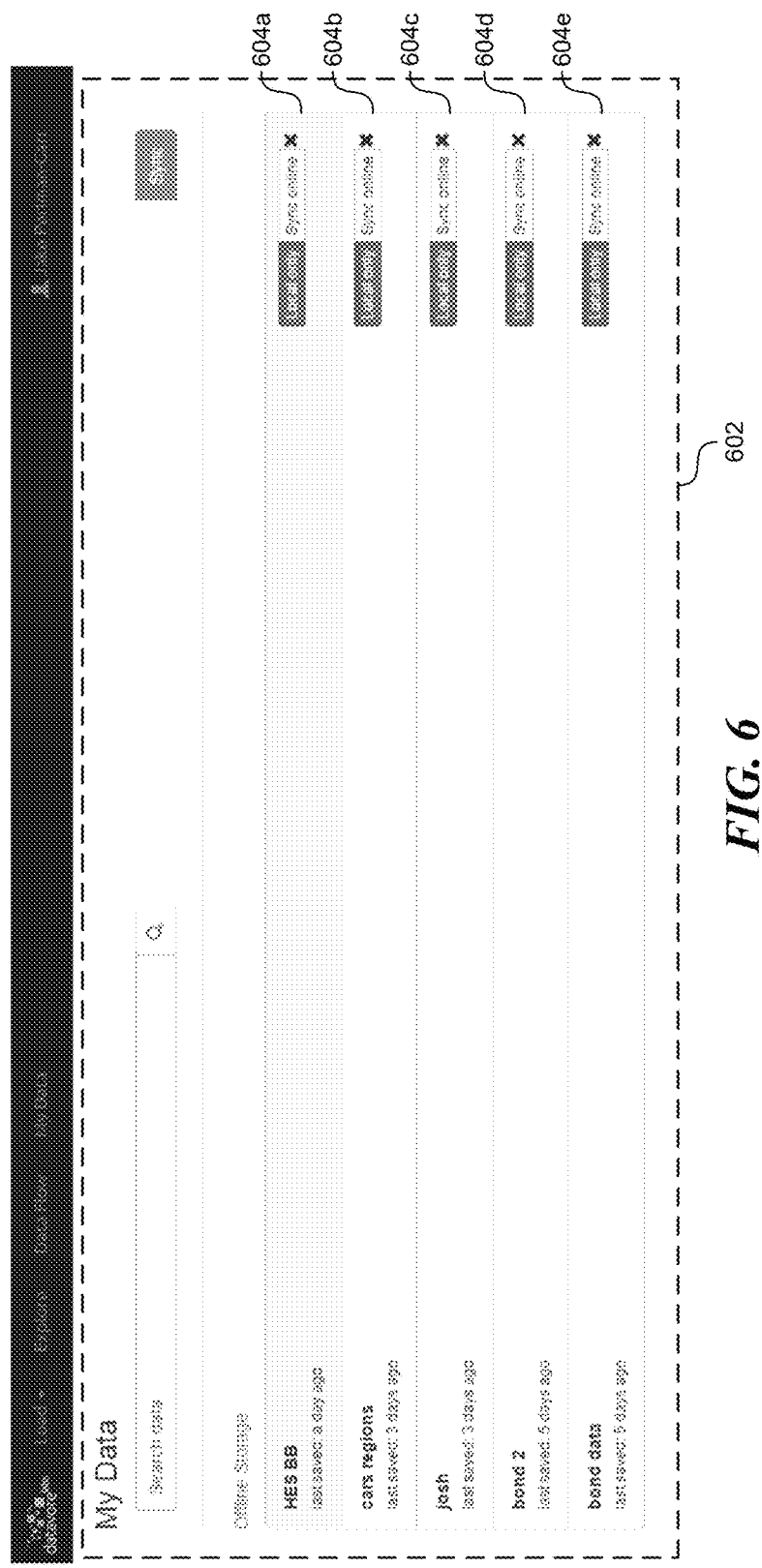
FIG. 6 illustrates an example of a data saving capability of the tool in which some embodiments of the present invention may be utilized.

FIG. 6 illustrates an example of a data saving capability of the tool in which some embodiments of the present invention may be utilized. In FIG. 6 data sets that have possibly been loaded, input, processed, queried, and/or operated on by the tool may be saved in storage. The storage may be any suitable electronic storage located local to the user and/or located remotely or online and/or located on a cloud based storage system. Each row 604, of the my data area 602, may represent different data sets that are saved. Each such data set may be saved locally or synced to remote/online/cloud storage.

Figure 7:
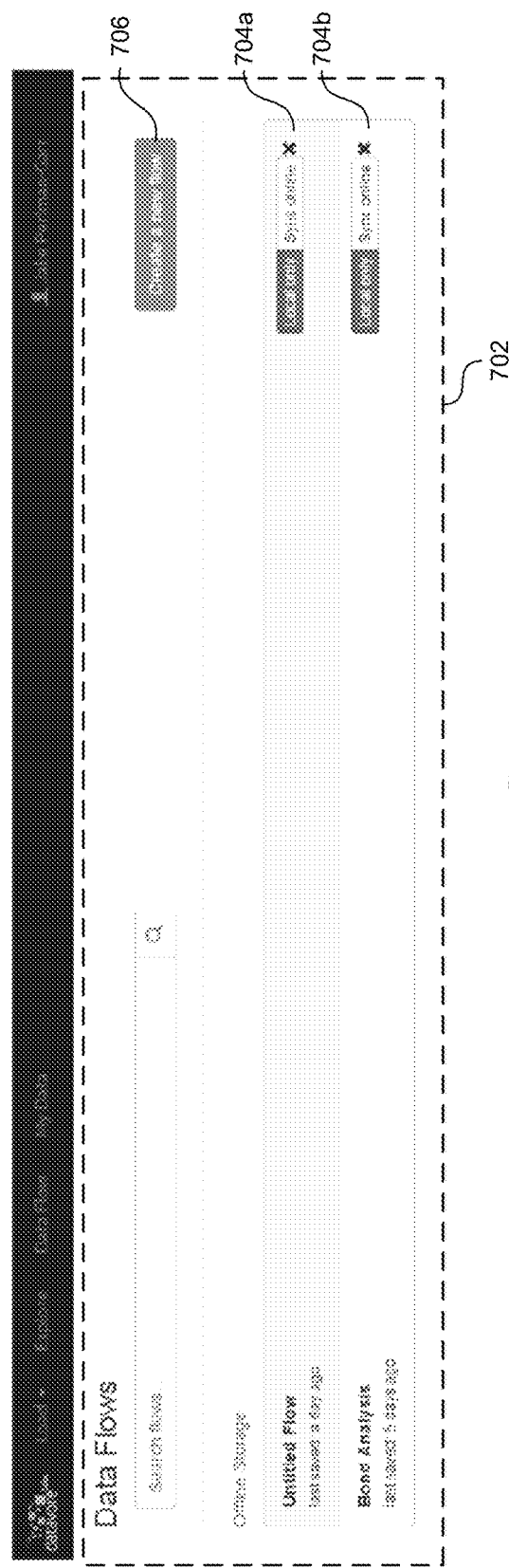
FIG. 7 illustrates an example of a work data flow saving capability of the tool in which some embodiments of the present invention may be utilized.

FIG. 7 illustrates an example of a work data flow saving capability of the tool in which some embodiments of the present invention may be utilized. A work data flow may be the step-by-step procedure by which any data processed by the tool is manipulated in order to analyze the data. For example, the step-by-step procedure may involve the user manipulating or operating on any data using the tool. As another example, the step-by-step procedure may involve an automatic step that is performed on any data by the tool. The work data flow may be used by, for example, a data analysis expert to analyze the data. The work data flow may be saved by the tool for later use. For example, the saved work data flow may be used for automation of analysis on different data, portability of data analysis techniques (i.e., the ability to send the work data flow to others or other computers and the ability to have the work data flow operate on other data), or as one or more building blocks for additional data analysis. In FIG. 7, data flow area 702 shows several work data flows that have been created and saved in storage using the tool. The storage may be any suitable electronic storage located local to the user and/or located remote or online and/or located on a cloud based storage system. Each row 704, displays a different saved data flow that is available for access by the tool. Each such work data flow may be saved locally or synced to remote/online/cloud storage. In addition, user input 706 may be used to create a new work data flow (i.e., to create and track a new step-by-step procedure by which any data is processed by the tool).

Figure 8:
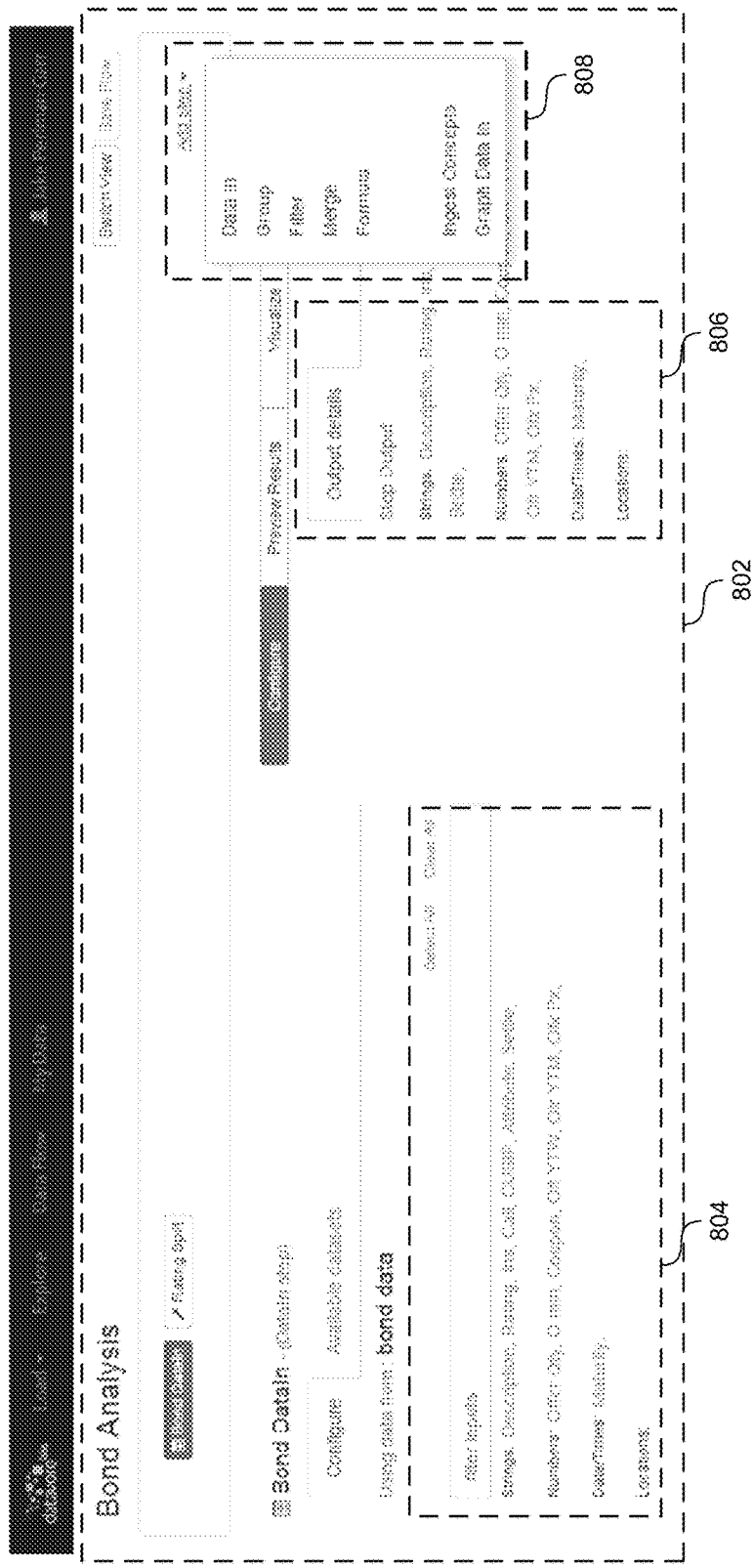
FIG. 8 illustrates an example of a data flow configuration capability of the tool in which some embodiments of the present invention may be utilized.

FIG. 8 illustrates an example of a data flow configuration capability of the tool in which some embodiments of the present invention may be utilized. In FIG. 8, area 802 can show the particular work data flow being configured. For example, area 802 shows a bond analysis work data flow being configured. Filter input area 804 may be used to filter the inputs of any data which is operated on by the tool. For example, a user may use filter input area 804 to define criteria such as a maturity date to select particular bonds from a data set containing bond information for multiple bonds. Outputs area 806 may allow a user to define what the tool will output as a result of the work data flow. For example, outputs area 806 may be used by a user to specify that bond ratings will be output by the bond analysis work data flow. In add step area 808, a user may be able to add steps in the work data flow. For example, the user may be able to add data processing steps (such as, e.g., data input, group data, filter data, merge data, use a formula on the data, ingest concepts, graph data, and/or other similar processing steps) to the work data flow. Pre-defined versions of these data processing steps are described in greater detail with reference to FIGS. 10-15 and 27-29 below. For example, in the bond data work data flow, a user can add a step of merging two different bond related information from a bond data set via add step area 808. Using the data flow configuration capability of the configure screen of FIG. 8, each user (e.g., a data analysis expert) may be able to create a personalized work data flow for the same data sets, so that the same data sets may be analyzed in a personalized way. However, the work data flows created may also be ported to other work data flows or across users of the tool.

Figure 9:
FIG. 9 illustrates an example of a preview of results capability of the tool in which some embodiments of the present invention may be utilized.

FIG. 9 illustrates an example of a preview of results capability of the tool in which some embodiments of the present invention may be utilized. Data preview area 902, shows a preview of the data that has been accessed by the tool. For example, data preview area 902 may show an income statement of a company. As another example, area 902 can show a preview of a data sets that shows different bonds and the ratings for the different bonds.

Figure 10:
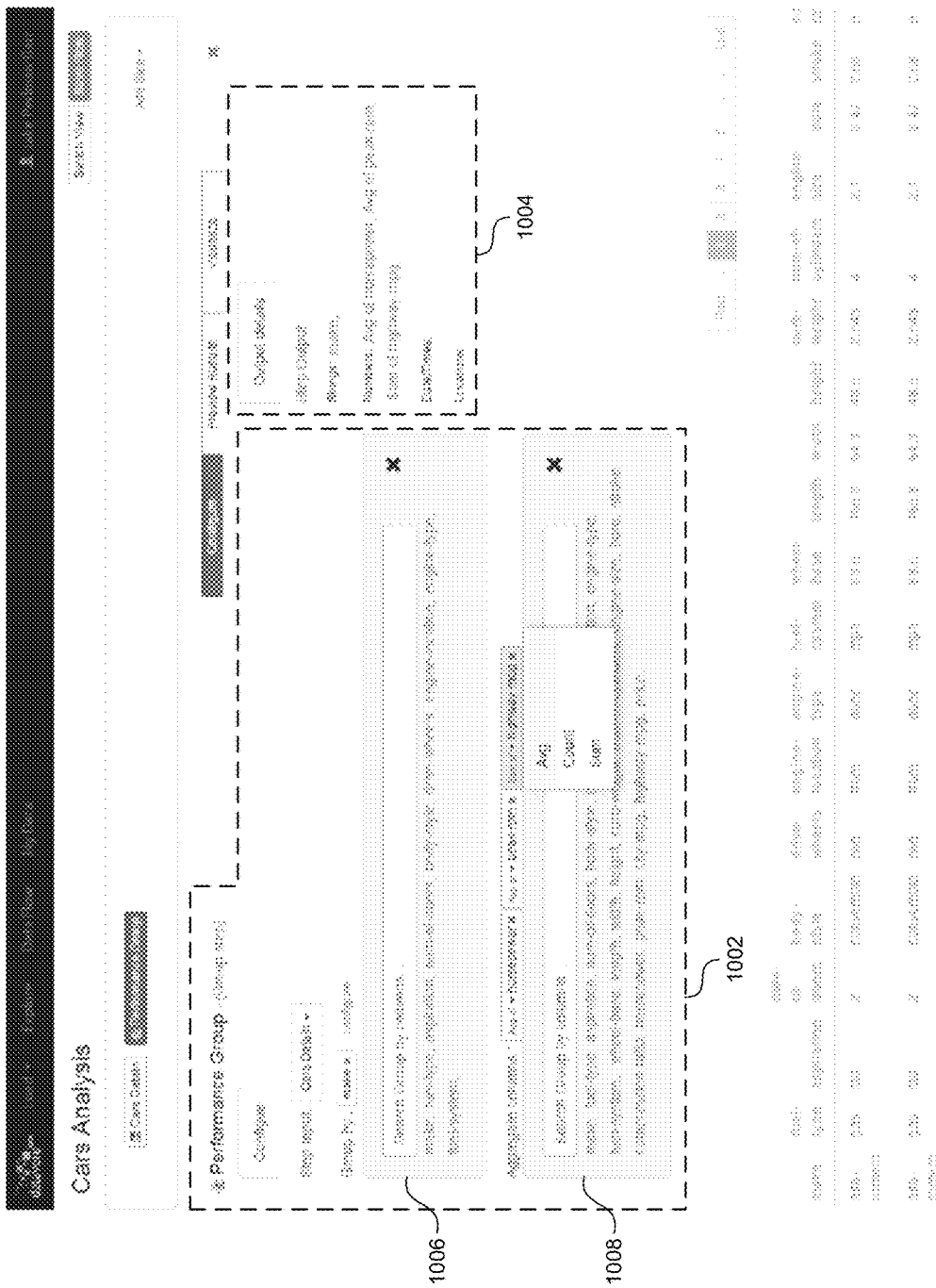
FIG. 10 illustrates an example of configuration of a group step in a work data flow capability of the tool in which some embodiments of the present invention may be utilized.

FIG. 10 illustrates an example of configuration of a group step in a work data flow capability of the tool in which some embodiments of the present invention may be utilized. Group step area 1002 may be used by a user to have the tool group different aspects (such as, e.g., the fields and/or columns) of a user selected data set within the work data flow that is being conducted on data sets being operated on by the tool (1006). In addition, group step area 1002 may be used by a user to have the tool aggregate different fields and/or columns a data set within the work data flow that is being conducted on data set being operated on by the tool (1008). As an example, the aggregation may include taking an average of the data, taking a sum of the data, and/or counting the total number of different types of data. For example, an user may choose to group a data set of cars data by the make of the cars. As another example, an user may choose to average the highway miles per gallon (mpg) of different cars in the data set of cars. Output details area 1004 may provide an area for a user to select or define aspects of the results of the operations (e.g., grouping or aggregation of data), selected to be performed in group step area 1002, for output. For example, the make of a car and an average of the highway miles per gallon for cars in the car data set may be selected or defined for output.

Figure 11:
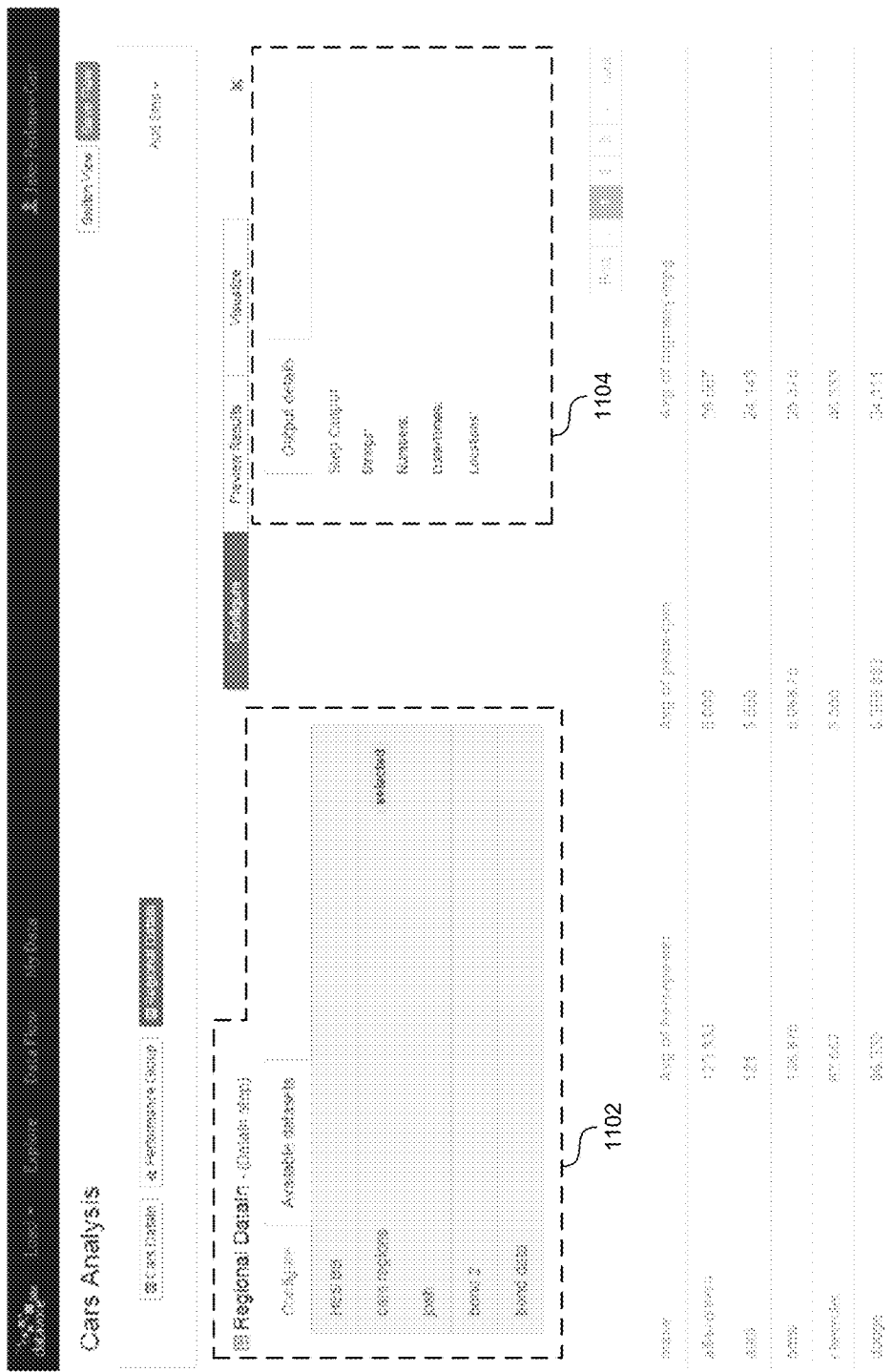
FIG. 11 illustrates an example of configuration of a datain step in a work data flow capability of the tool in which some embodiments of the present invention may be utilized.

FIG. 11 illustrates an example of configuration of a datain step in a work data flow capability of the tool in which some embodiments of the present invention may be utilized. Datain selection area 1102 may be used by an user to select different data sets available in the tool, so that the data sets may be operated on by the tool as a part of a work data flow. For example, a user may be able to select a data set containing bond information in addition to a data set containing car information. The selected data sets may be used in the same or in different work data flows. Output details area 1104 may be able to provide an area for a user to select or define aspects to be output from the datain operation based on the data sets selected in datain selection area 1102 by a user of the tool. For example, particular numbers, and/or locations, and/or dates/times, and/or particular strings, and/or any other fields or columns in the data set(s) may be selected or defined for output.

Figure 12:
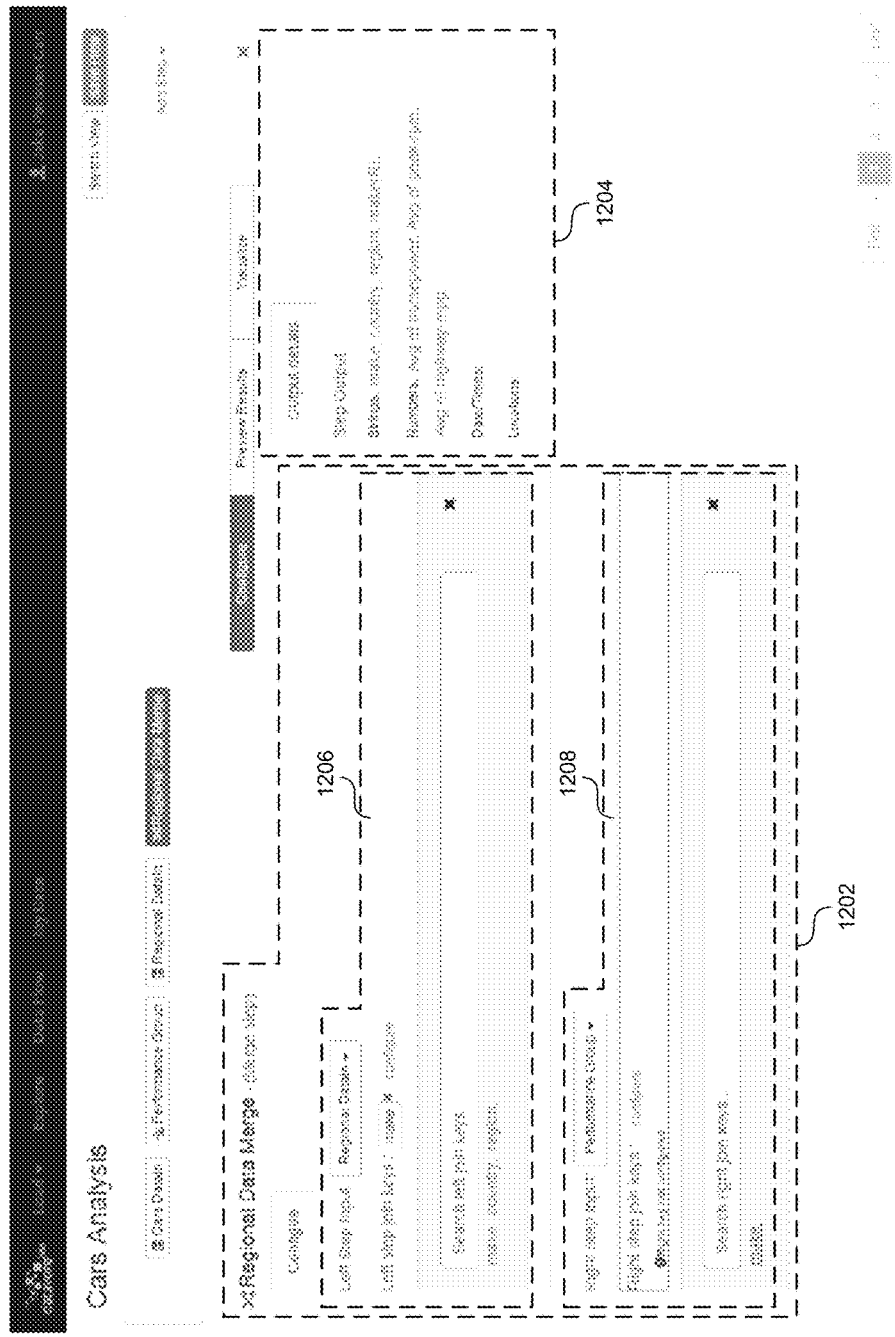
FIG. 12 illustrates an example of configuration of a merge step in a work data flow capability of the tool in which some embodiments of the present invention may be utilized.

FIG. 12 illustrates an example of configuration of a merge step in a work data flow capability of the tool in which some embodiments of the present invention may be utilized. Merge step area 1202 may be used by an user to have the tool merge different aspects (such as, e.g., the fields and/or columns) of multiple user selected data sets within the work data flow that is being conducted on data sets being operated on by the tool. A left input data set (1206) and a right input data set (1208) may be input by a user in merge step area 1202. In addition, the fields and/or columns that are to be merged may be configured for each data set. For example, as shown in FIG. 12, a left input data set may be regional datain data, and a right input data set may be performance group data, and the "make" column may be the column that is used to merge the two data sets. Output details area 1204 may be able to provide an area for users to select or define particular aspects of the results (e.g., particular fields and/or columns) of the merging of data sets, selected in merge step area 1202, to output. For example, the make of a car and an average of the highway miles per gallon for cars in the car data set may be selected or defined for output. The resulting output may be saved on any storage as a new data set or modified through additional steps in the work data flow.

Figure 13:
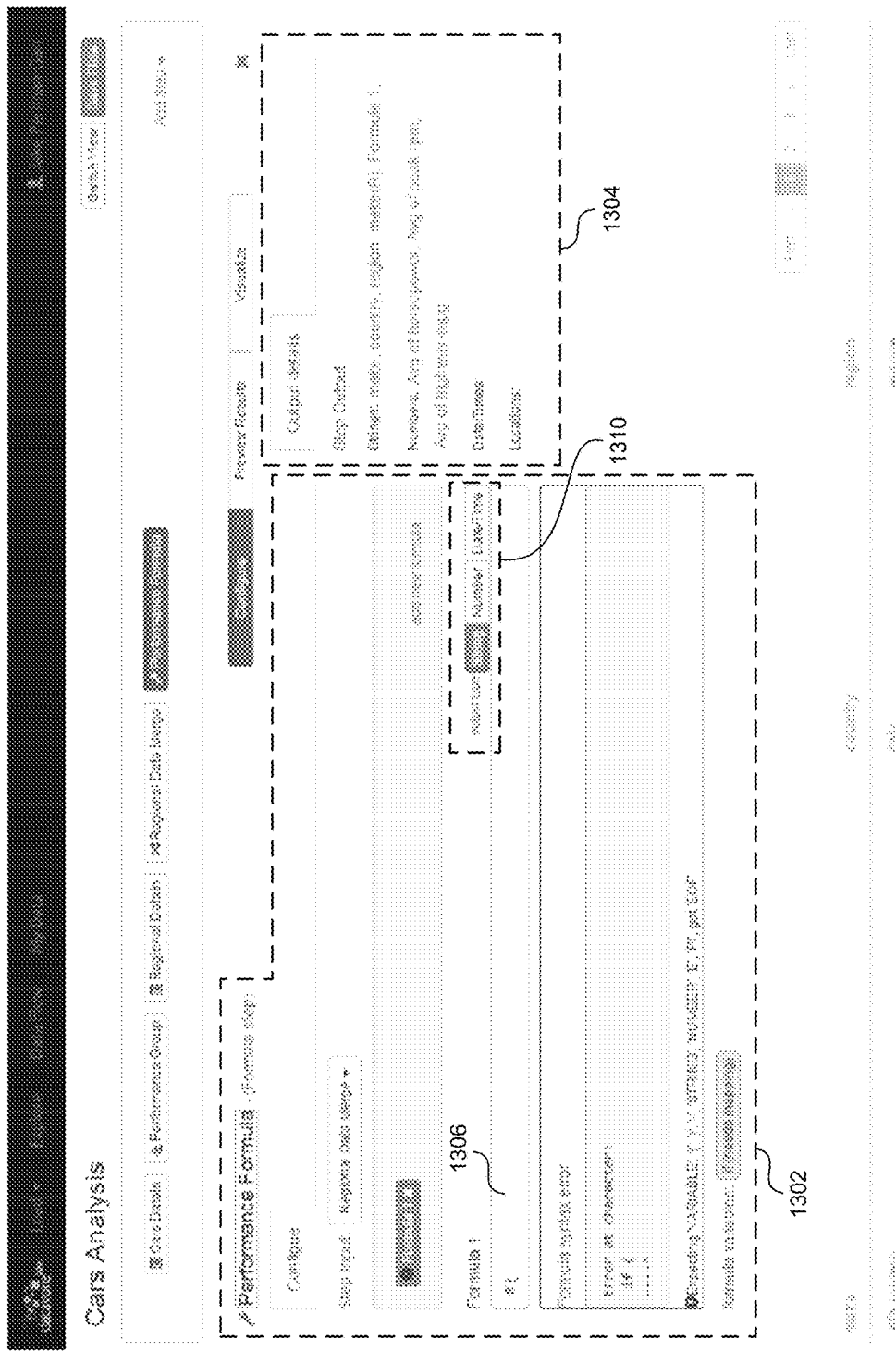
FIG. 13 illustrates a first example of configuration of a formula step in a work data flow capability of the tool in which some embodiments of the present invention may be utilized.

FIG. 13 illustrates a first example of configuration of a formula step in a work data flow capability of the tool in which some embodiments of the present invention may be utilized. Formula step area 1302 may be used by a user to define a formula or algorithm (e.g., an Excel-like formula) to operate on aspects of the data (such as, e.g., one or more fields, records, cells, or columns) in one or more user selected data sets being operated on by the tool. In some embodiments, a formula and/or an algorithm may be defined (e.g., as a string of characters and/or words) by a user using formula input area 1306. In some embodiments, a pre-defined formula and/or algorithm may be selected for use by a user using formula input area 1306. In some embodiments, the formula and/or the algorithm may automatically have its syntax checked by the tool, and the result of the syntax check (e.g., a syntax error notification and/or a means to correct the syntax) may be provided in area 1302. In area 1310, the user may select the output type of the formula and/or the algorithm to be, for example, a string, a number, or the date and/or time. Output details area 1304 may be able to provide an area for users to select or define particular aspects of the results (e.g., particular fields and/or columns) of the operations performed by the user defined formulas or algorithms, selected or defined in formula step area 1302, for output. For example, the result of the use of a user defined formula and an average of the highway miles per gallon for cars in the car data set may selected or defined for output.

Figure 14:
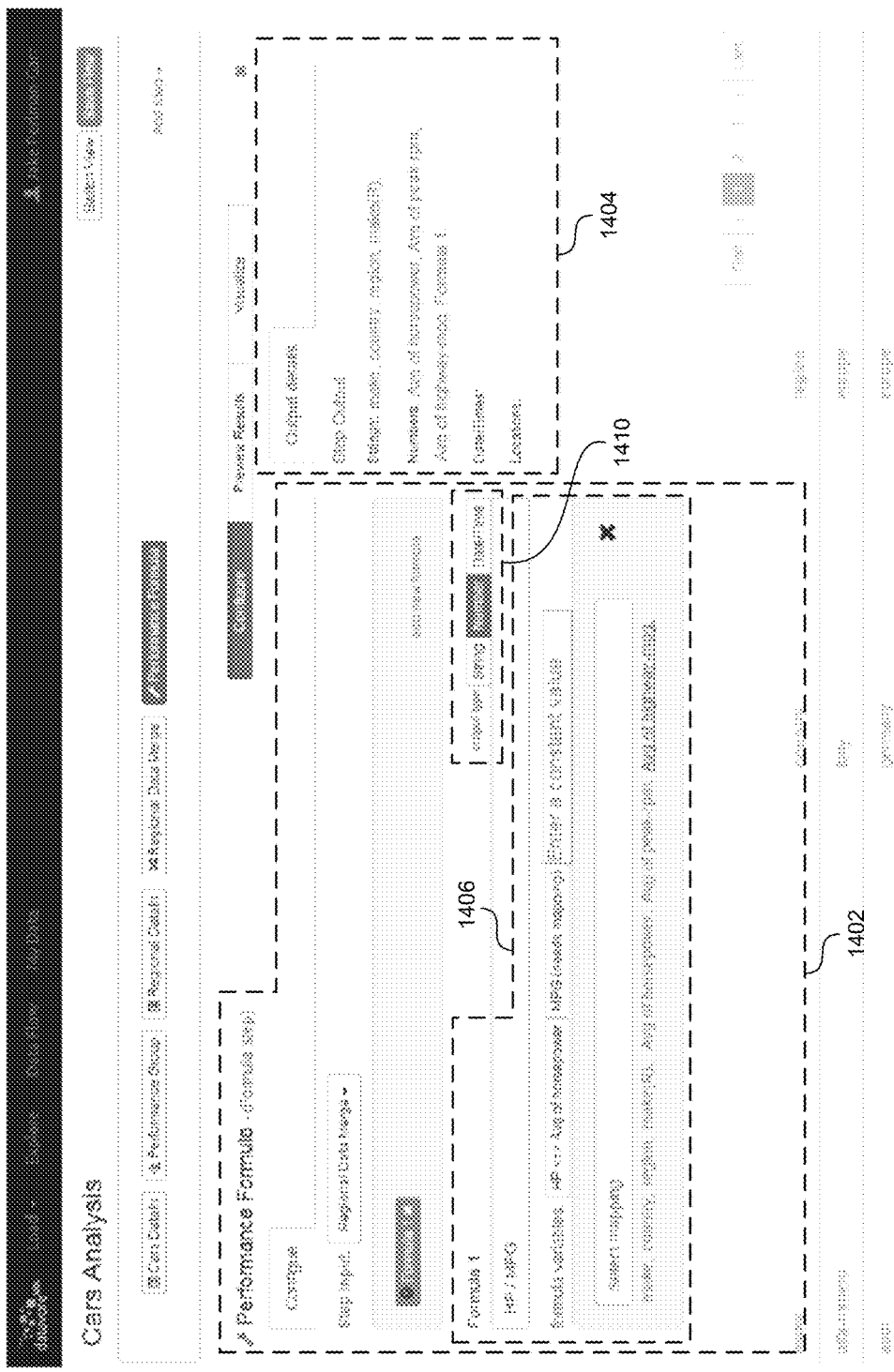
FIG. 14 illustrates a second example of configuration of a formula step in a work data flow capability of the tool in which some embodiments of the present invention may be utilized.

FIG. 14 illustrates a second example of configuration of a formula step in a work data flow capability of the tool in which some embodiments of the present invention may be utilized. Similar to formula step area 1302 of FIG. 13, formula step area 1402 may be used by an user to define a formula or algorithm to operate on aspects of the data (such as one, e.g., one or more fields, records, cells, or columns) in one or more user selected data sets being operated on by the tool. In some embodiments, a formula and/or an algorithm may be defined (e.g., as a numerical computation) by a user using formula input area 1406. In some embodiments, a pre-defined formula and/or algorithm may be selected for use by a user using formula input area 1406. Formula input area 1406 may also be used to map a particular aspect of the data (such as, e.g., a field, a record, a cell, or a column) to variable names that can be used to define the formula and/or algorithm. For example, in FIG. 14, a user may define "Formula 1" as "HP/MPG," where "HP" is mapped to average horsepower column in a data set pertaining to car related data. In area 1410, the user may select the output type of the formula and/or the algorithm to be, for example, a string, a number, or the date and/or time. Output details area 1404 may be able to provide an area for users to select or define particular aspects of the results (e.g., particular fields and/or columns) of the operations performed by the user defined formulas or algorithms, selected or defined in formula step area 1402, for output. For example, the result of the use of a user defined formula, Formula 1, and an average of the highway miles per gallon for cars in the car data set may selected or defined for output.

Figure 15:
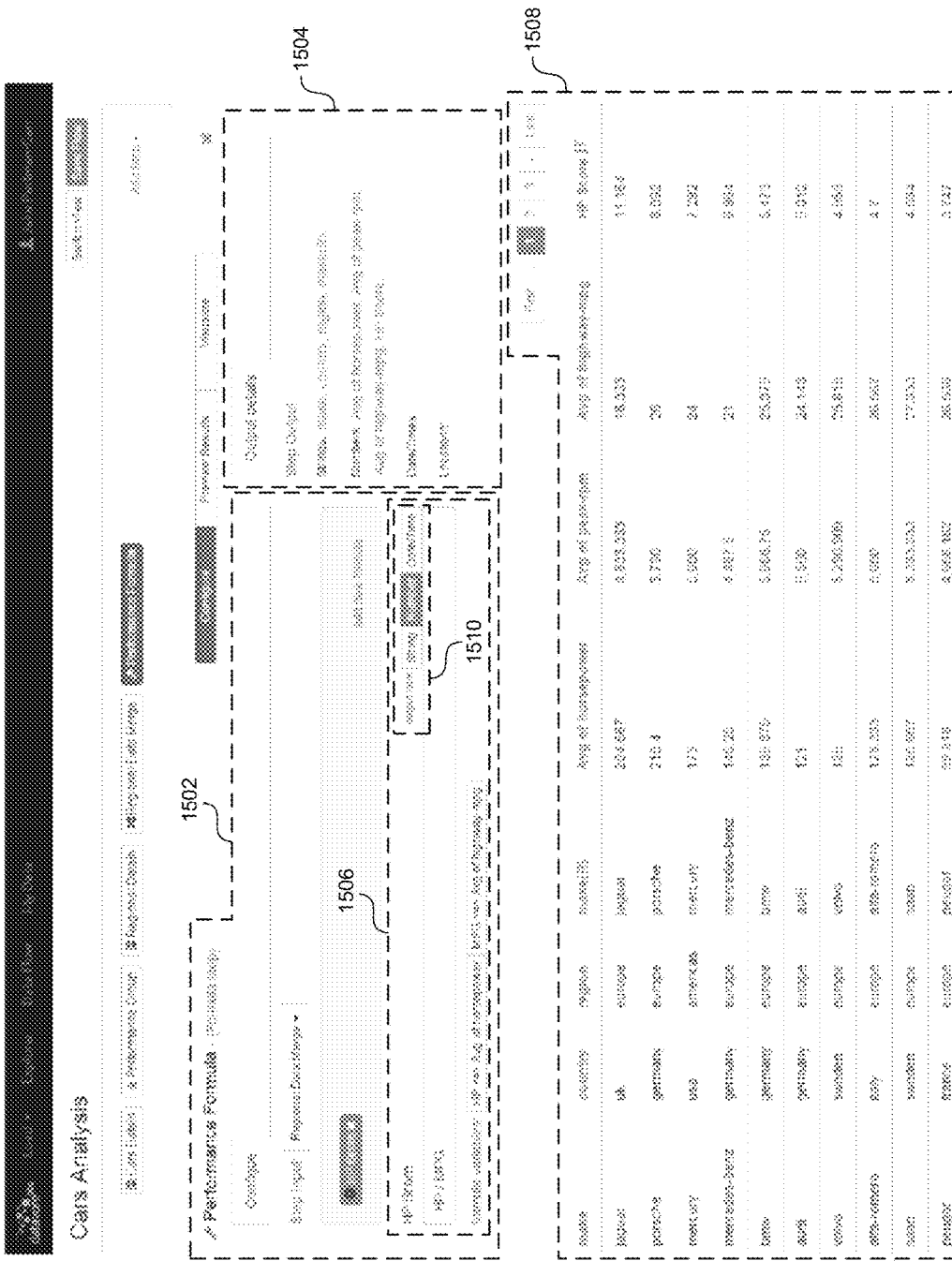
FIG. 15 illustrates a third example of configuration of a formula step (with results) in a work data flow capability of the tool in which some embodiments of the present invention may be utilized.

FIG. 15 illustrates a third example of configuration of a formula step (with results) in a work data flow capability of the tool in which some embodiments of the present invention may be utilized. Similar to formula step area 1402 of FIG. 14, formula step area 1502 may be used by an user to define a formula or algorithm to operate on aspects of the data (such as one, e.g., one or more fields, records, cells, or columns) in one or more user selected data sets being operated on by the tool. In some embodiments, a formula and/or an algorithm may be defined (e.g., as a numerical computation) by a user using formula input area 1506. In some embodiments, a pre-defined formula and/or algorithm may be selected for use by a user using formula input area 1506. Formula input area 1506 may also be used to map a particular aspect of the data (such as, e.g., a field, a record, a cell, or a column) to variable names that can be used to define the formula and/or algorithm. For example, in FIG. 15, a user may define "HP Score" as "HP/MPG," where "HP" is mapped to average horsepower column and "MPG" is mapped to average highway miles per gallon in a data set pertaining to car related data. In area 1510, the user may select the output type of the formula and/or the algorithm to be, for example, a string, a number, or the date and/or time. Output details area 1504 may be able to provide an area for users to select or define particular aspects of the results (e.g., particular fields and/or columns) of the operations performed by the user defined formulas or algorithms, selected or defined in formula step area 1502, for output. For example, the result of the use of a user defined formula, "HP/MPG," and an average of the highway miles per gallon for cars in the car data set may selected or defined for output. Results area 1508 may show the output of the formula step. In some embodiments, the aspects of data selected or defined for output in output details area 1504 may be output in results area 1508. For example, the data in the columns that are labeled make, country, region, Make®, Avg. of horsepower, Avg of peak-pm, Avg of highway-mpg, and the result of the user-defined formula "HP Score" may each be output as shown in results area 1508.

Figure 16:
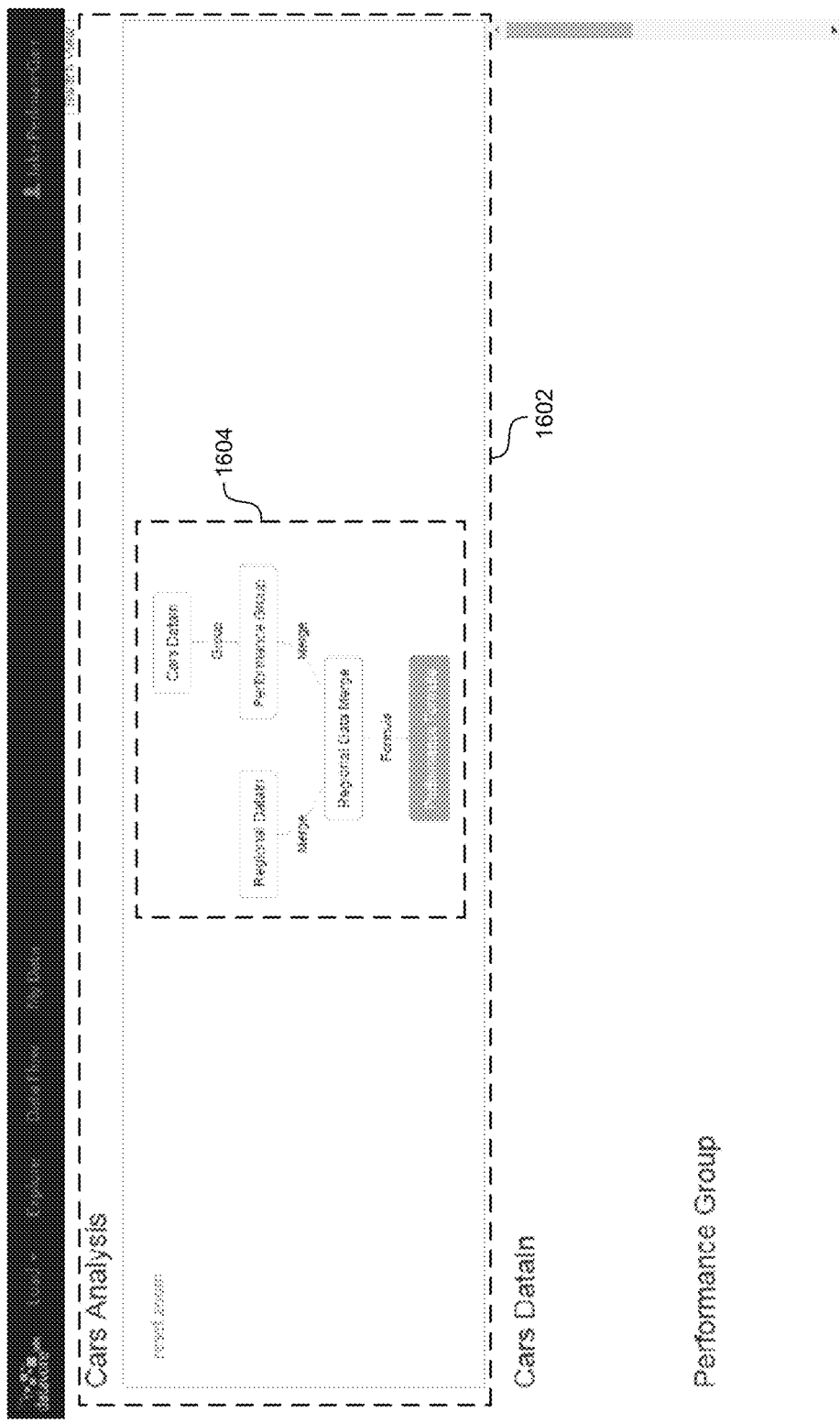
FIG. 16 illustrates an example of a work data flow visual viewing capability of the tool in which some embodiments of the present invention may be utilized.

FIG. 16 illustrates an example of a work data flow viewing capability of the tool in which some embodiments of the present invention may be utilized. In FIG. 16, work data flow visualization area 1602 allows a user to select or identify, for visualization, a work data flow that has been created or predefined by the user and/or other users and/or prepackaged with the tool. In particular, selected or identified work data flow(s) can be presented to the user in a tree format in area 1604. In the tree format, nodes are different data processing steps (such as, e.g., data input, group data, filter data, merge data, use a formula on the data, ingest concepts, graph data, and/or other similar processing steps) or the outputs of these data processing steps, and the edges represent the flow of data between data processing the steps (or their outputs) from top to bottom or left to right. In some embodiments, the tree may be displayed to the user in a top-to-bottom tree orientation format. In some embodiments, the tree may be displayed to the user in a left-to-right tree orientation format. The user may be able to select between a top-to-bottom orientation format or a left-to right orientation format for the tree. A user may be able to zoom in or out on the tree within area 1604.

Figure 17:
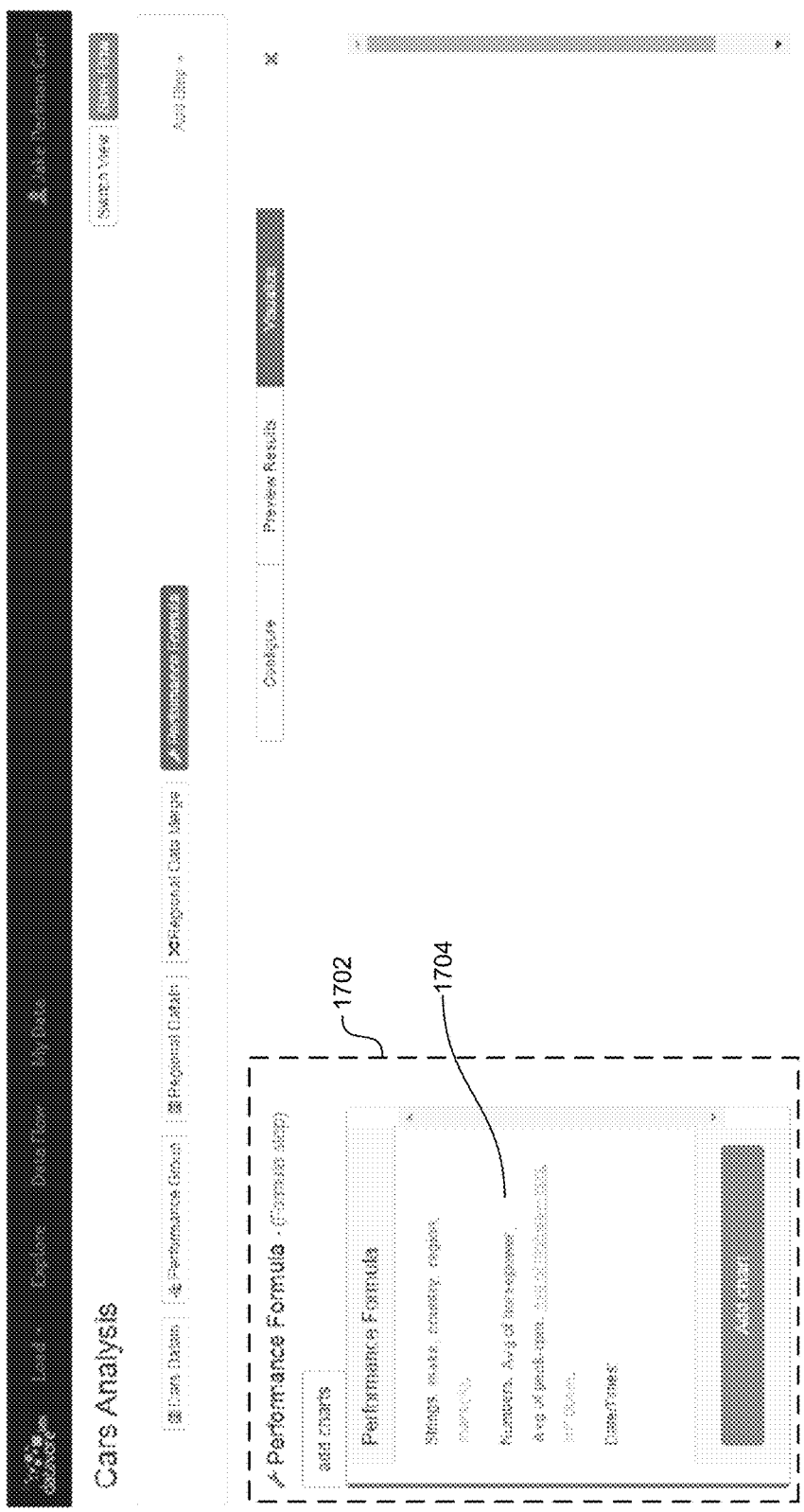
FIG. 17 illustrates an example of a visualization configuration capability of the tool in which some embodiments of the present invention may be utilized.

FIG. 17 illustrates an example of a visualization configuration capability of the tool in which some embodiments of the present invention may be utilized. In FIG. 17, work data flow visualization area 1702 allows a user to select or identify, for visualization, different aspects of the data (e.g., particular fields and/or columns of data set(s)) that are being operated on by the tool, or any of the results/outputs of formulas or algorithms that operate on the aspects of the data. In particular, the user may be able to select or identify these aspects in area 1704 of the data for visualization. In addition, any selected and/or identified aspects of the data may be added to one or more chart(s) area 1704. The result of this visualization configuration step may be the one or more of the charts shown in FIGS. 18-22.

Figure 18:
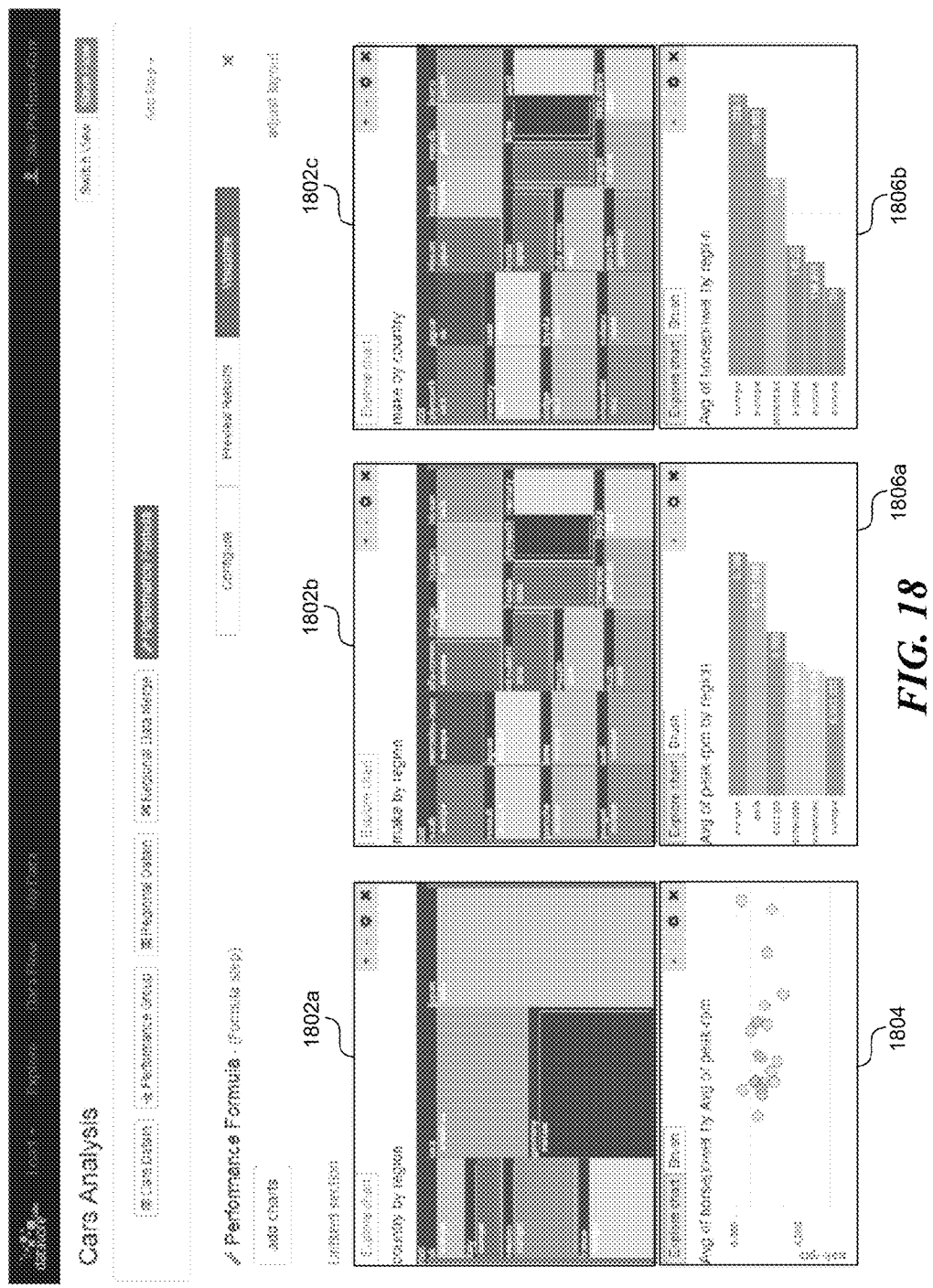
FIG. 18 illustrates a first example of a visualization capability of the tool in which some embodiments of the present invention may be utilized.
Figure 19:
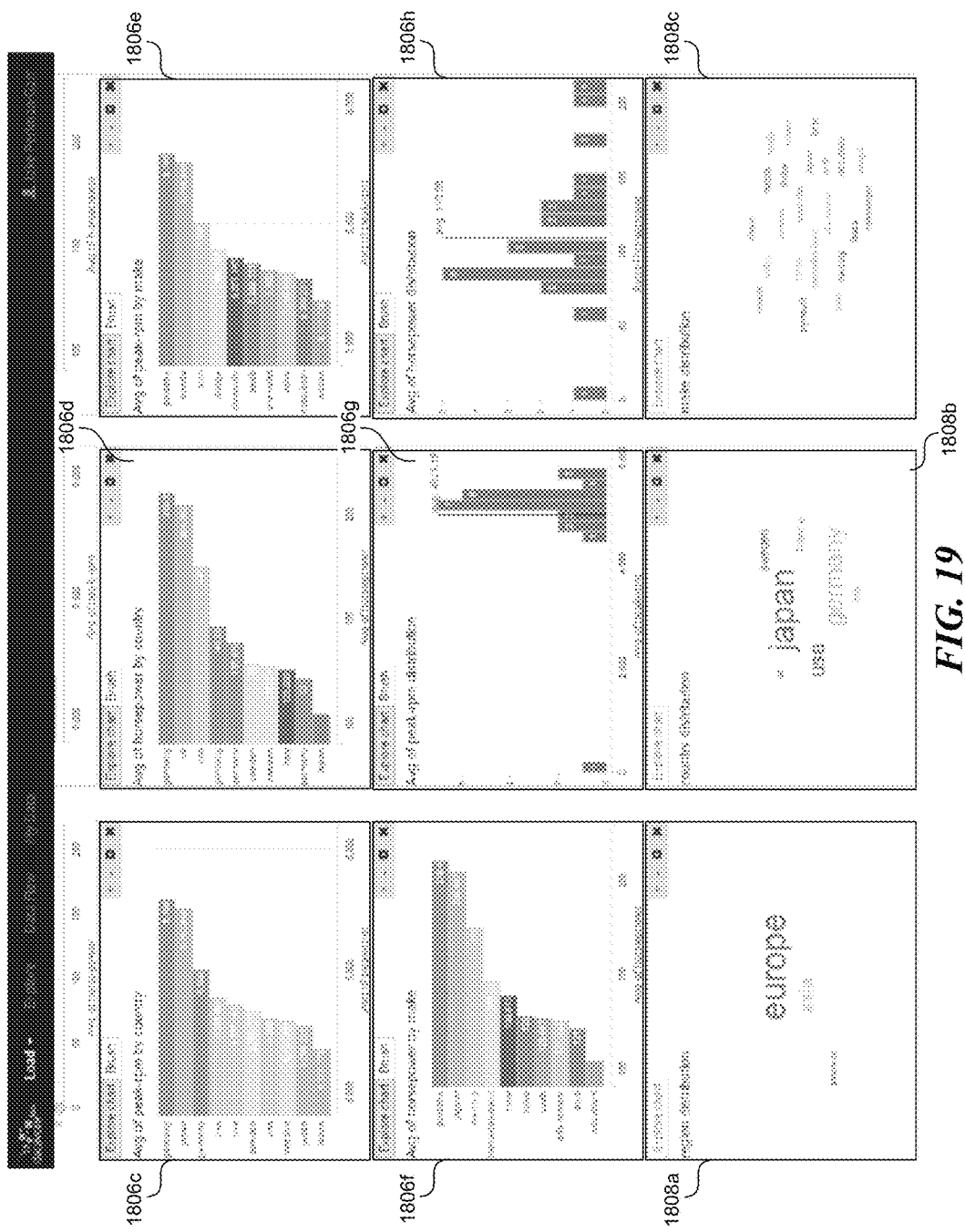
FIG. 19 illustrates a second example of a visualization capability of the tool in which some embodiments of the present invention may be utilized.

FIGS. 18 and 19 illustrate an example of a visualization capability of the tool in which some embodiments of the present invention may be utilized. In FIGS. 18 and 19, multiple types of charts have been generated by the tool. For example, these charts may have been generated based on the user inputs as described with reference to FIG. 17. The charts generated by the tool may be of any variety, including but not limited to, histograms, bar charts, pie charts, line charts, scatter plots, timeline charts, tree charts, tree maps, flow charts, area charts, cartograms, pedigree charts, bubble charts, significance charts, distributions, or any other suitable type of chart that can represent any type or format of data. The charts may have any aspect of the data (e.g., selected or identified by a user such as in FIG. 17) plotted on its own. The charts may have any combinations of aspects of the data (e.g., selected or identified by a user such as in FIG. 17) plotted on different axes of the chart. The charts may include distributions or statistical information related to any aspect of the data (e.g., selected or identified by a user such as in FIG. 17). For example 1802*a*, 1802*b*, and 1802*c* show tree maps. In particular, 1802*a* may show a treemap of country by region of cars related data, 1802*b* may show a treemap of make by region of cars related data, and 1802*c* may show a treemap of make by country of cars related data in the cars data set. For example 1804 shows a scatter plot. In particular, 1804 may show a scatter plot of average horsepower by average peak-rpm in the cars data set. For example 1806*a*, 1806*b*, 1806*c*, 1806*d*, 1806*e*, 1806*f*, 1806*g*, and 1806*h* show bar charts. In particular, 1806*a* may show a bar graph of average of peak rpm by region, 1806*b* may show a bar graph of average horsepower by region, 1806*c* may show a bar graph of average peak-rpm by country, 1806*d* may show a bar graph of average horsepower by country, 1806*e* may show a bar graph of average peak-rpm by make, 1806*f* may show a bar graph of average horsepower by make, 1806*g* may show a bar graph of the distribution of average peak-rpm, 1806*h* may show a bar graph of the distribution of average horsepower in the cars data set. For example 1808*a*, 1808*b*, and 1808*c* of FIG. 18 show distribution significance charts. In particular, 1808*a* may show a distribution significance chart of the region, 1808*b* may show a distribution significance chart of the country, 1808*c* may show a distribution significance chart of the make in the cars data set. One or more of these charts, or any other charts may be displayed by the tool automatically and/or via user request.

Figure 20:
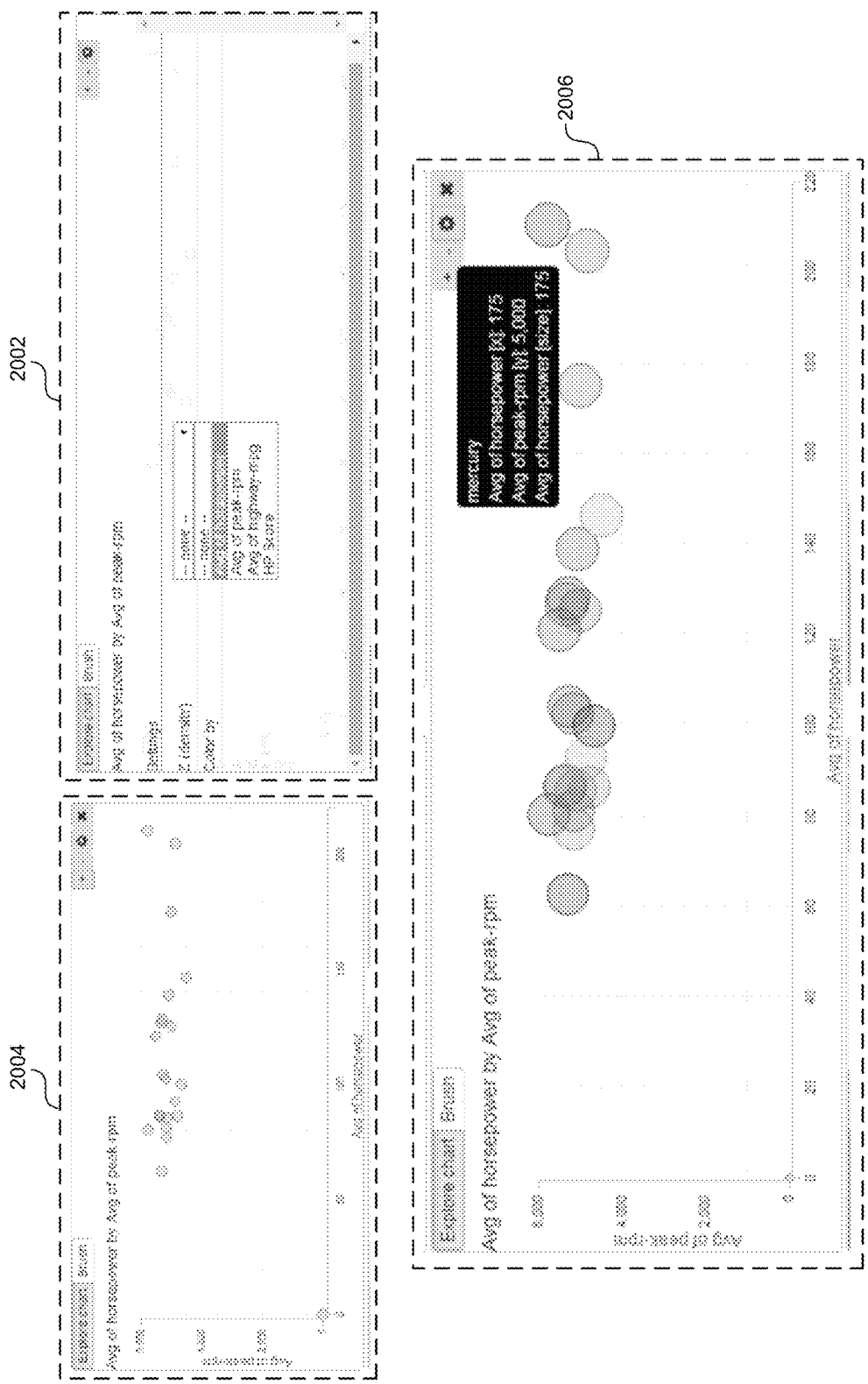
FIG. 20 illustrates an example of a visualization settings capability of the tool in which some embodiments of the present invention may be utilized.

FIG. 20 illustrates an example of a visualization settings capability of the tool in which some embodiments of the present invention may be utilized. In FIG. 20, settings area 2002 may be used view and change various settings on charts that have been generated by the tool (e.g., the charts as shown and described with reference to FIGS. 18 and 19). In some embodiments, the settings for various charts created by the tool may be automatic and these settings may be viewed in settings area 2002. In some embodiments, using settings area 2002, a user may be able to change the axes on which various aspects of the data have been charted on a particular chart. As another example, using settings area 2002, a user may be able to change the look and feel of a particular chart. The look and feel may include the colors, shading, density, sizes, relative sizes, axes settings, scales, dimensions, or any other similar chart settings for any aspects of data that have been charted and/or any objects that appear on the chart. Chart viewing area 2004 may show the previous version of the chart before any changes to the settings made in area 2002 are applied to the chart. Chart viewing area 2006 may show the revised version of a chart after the settings made in area 2002 are applied to the chart. For example, settings area 2002 shows changes being made to the color scheme for different aspects of the cars data shown in the chart within area 2004 and those changes being applied in the chart within area 2006. In FIG. 20 a black box is depicted within the chart show in area 2006. The box is a "mouse over," which displays information about a particular aspects of a data point (e.g., it's coordinates and size) to which a user points or selects on the chart. Similarly, any charts or visualizations described in the present disclosure may be capable of displaying such information about data points via a "mouse over" or other known techniques.

Figure 21:
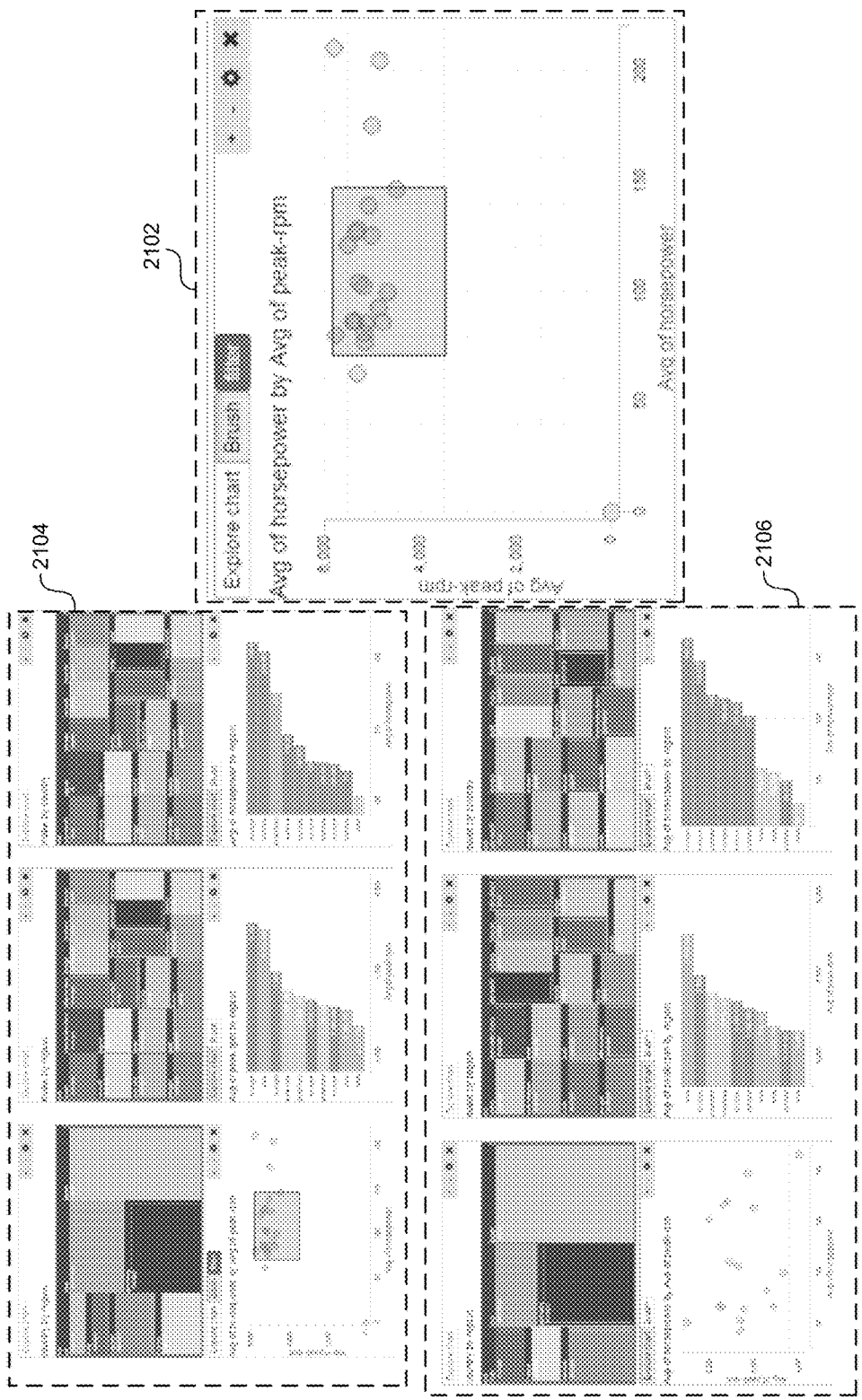
FIG. 21 illustrates an example of a first visualization filtering capability of the tool in which some embodiments of the present invention may be utilized.

FIG. 21 illustrates an example of a first visualization filtering capability of the tool in which some embodiments of the present invention may be utilized. In FIG. 21, filtering area 2102 shows a chart on which a user can select a range of data to filter in or to filter out. In some embodiments, the user may be able to select an area within the chart shown in filtering area 2102 so that all the data outside of that selected area may be filtered out from the data being visualized and/or operated on by the tool. In some embodiments, the user may be able to select or input range(s) of any of the axes of data within the chart show in filtering area 2102 so that all the data outside of that selected or inputted range(s) may be filtered out from the data being visualized and/or operated on by the tool. Pre-filtered chart area 2104 may display one or more charts pertaining to the data being operated on by the tool prior to the user selected or inputted filtering of that data is performed. Post-filtered chart area 2106 may display one or more charts pertaining to the data being operated on by the tool after the user selected or inputted filtering of that data is performed. For example, in filtering area 2102, a user may identify an area on which to focus which denotes an area outside of which data will be filtered out within a scatter plot of average horsepower by average peak-rpm of the cars data set. Pre-filtered chart area 2104 may display other charts related to this cars data set, such as, a country by region treemap, a make by region treemap, a make by country treemap, an average horsepower by average peak-rpm scatter plot, an average of peak rpm by region bar graph, and/or an average horsepower by region bar graph before the user-selected filtering shown in area 2102 is applied to the data. Post-filtered chart area 2106 may also display other charts related to this cars data set, such as, a country by region treemap, a make by region treemap, a make by country treemap, an average horsepower by average peak-rpm scatter plot, an average of peak rpm by region bar graph, and/or an average horsepower by region bar graph after the user-selected filtering shown in area 2102 is applied to the data. Any other charts, such as the types of charts described above in FIGS. 18 and 19, may be similarly filtered in the filtering area and displayed in the pre-filter area and/or the post-filter area.

Figure 22:
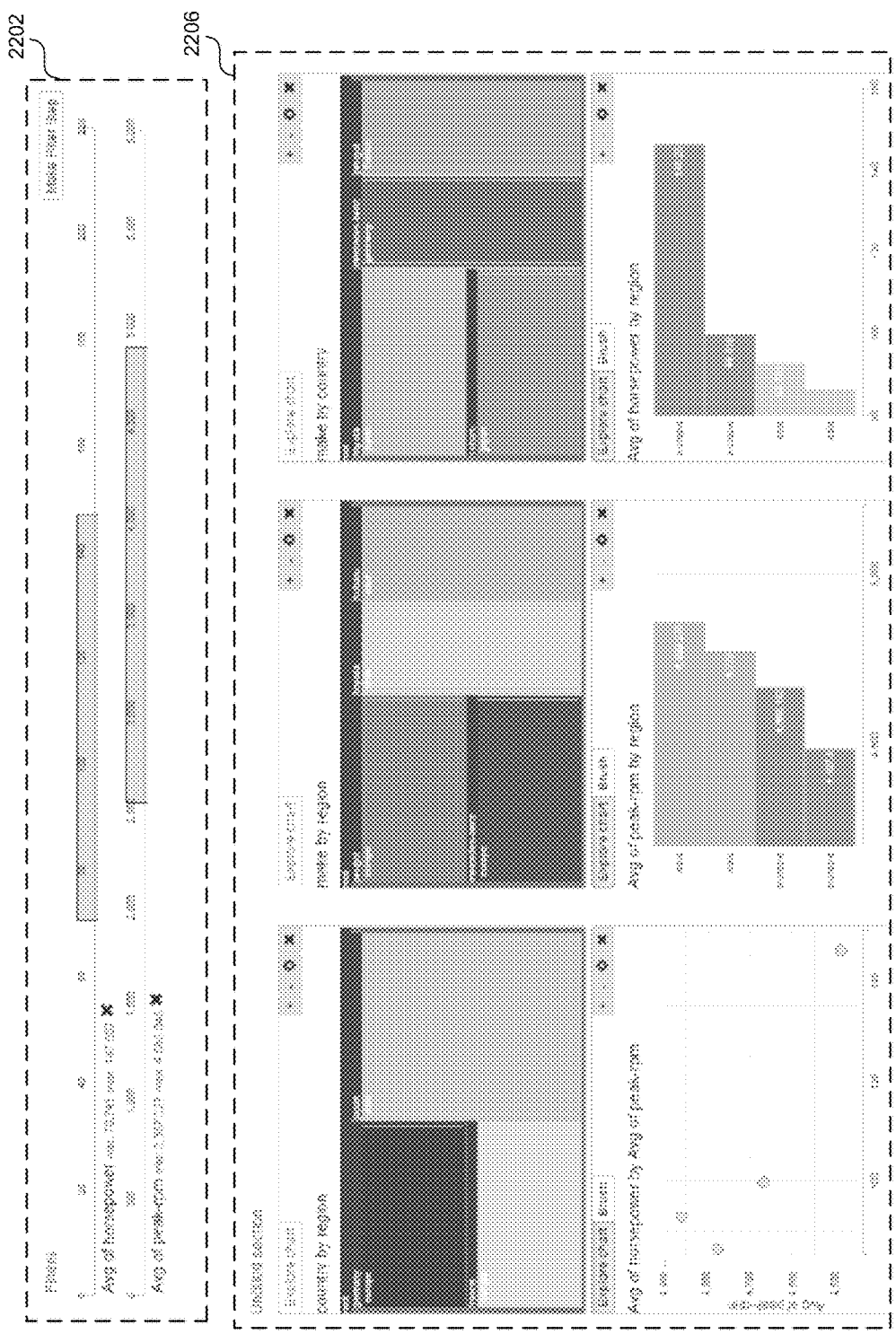
FIG. 22 illustrates an example of a second visualization filtering capability of the tool in which some embodiments of the present invention may be utilized.

FIG. 22 illustrates an example of a second visualization filtering capability of the tool in which some embodiments of the present invention may be utilized. In FIG. 22, filtering area 2202 shows one or more ranges of data from which a user can select a portion or interval. In some embodiments, the user may be able to select or input an interval or intervals within the in filtering area 2202 so that all the data outside of that selected interval(s) may be filtered out from the data being visualized and/or operated on by the tool. In some embodiments, the user may be able to select or input, in filtering area 2202, range(s) of any of the axes of data in any chart associated with the data being operated on by the tool so that all the data outside of that selected or inputted range(s) may be filtered out from the data being visualized and/or operated on by the tool. Post-filtered chart area 2206 may display one or more charts pertaining to the data being operated on by the tool after the user selected or inputted filtering of that data is performed. For example, in filtering area 2202, a user may identify an small interval of data on which to focus in the full range of average horsepower aspect of the cars data set, the user may also identify an small interval of data on which to focus in the full range of average peak rpm aspect of the cars data set, which may denote that intervals falling outside of the user identified average horsepower and average peak rpm may be filtered out by the tool. Post-filtered chart area 2206 may display charts related to this cars data set, such as, a country by region treemap, a make by region treemap, a make by country treemap, an average horsepower by average peak-rpm scatter plot, an average of peak rpm by region bar graph, and/or an average horsepower by region bar graph after the user-selected filtering shown in area 2202 is applied to the data. Any other charts, such as the types of charts described above in FIGS. 18 and 19, may be similarly filtered in the filtering area and displayed in the pre-filter area and/or the post-filter area.

Figure 23:
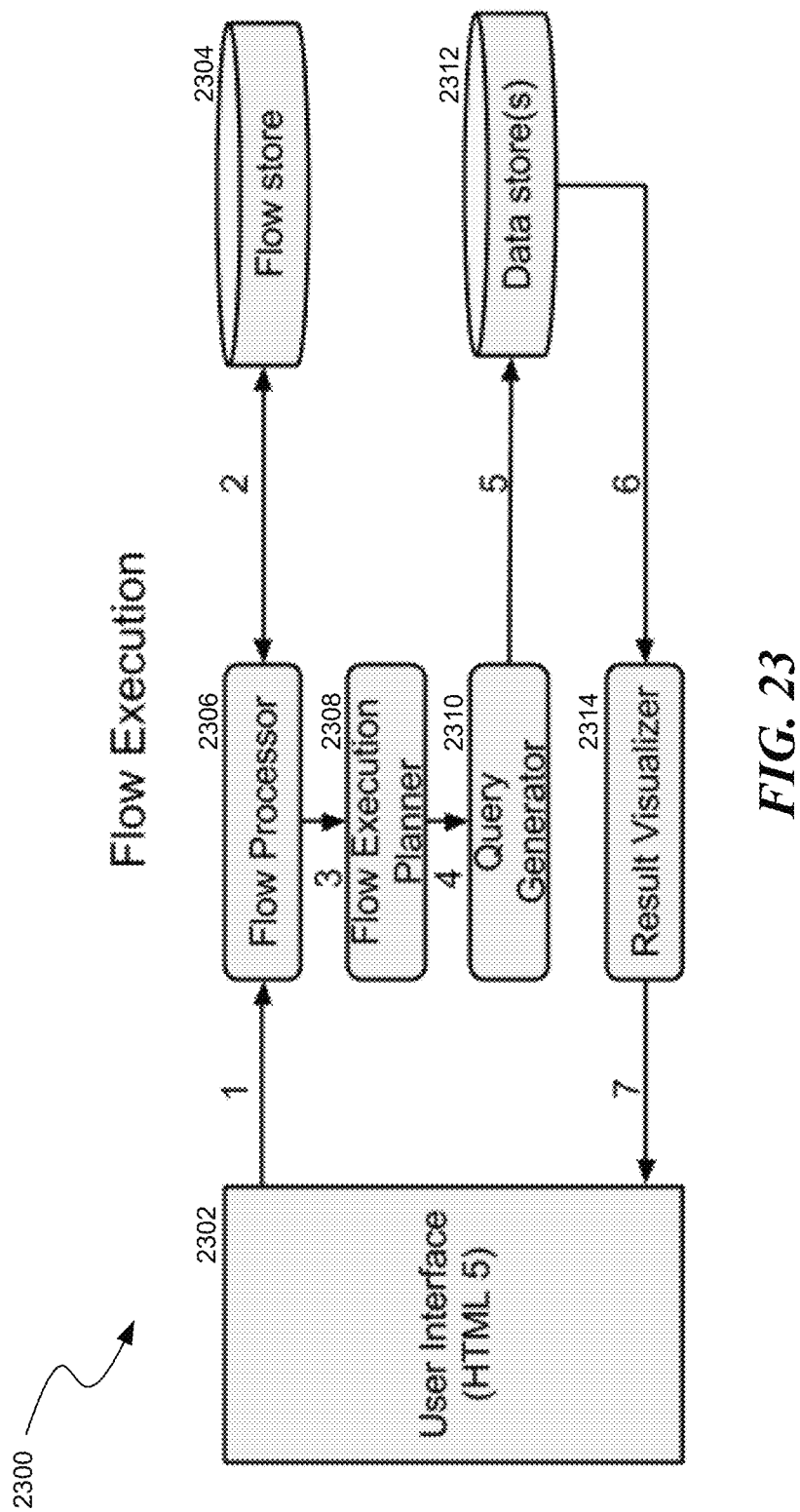
FIG. 23 illustrates a system flow diagram of operations occurring during work data flow execution using the tool in which some embodiments of the present invention may be utilized.

FIG. 23 illustrates a system flow diagram 2300 of operations occurring during work data flow execution using the tool in which some embodiments of the present invention may be utilized. System flow diagram 2300 includes user interface 2302, flow store 2304, flow processor 2306, flow execution planner 2308, query generator 2310, data store(s) 2312, and result visualizer 2314. User interface 2302 may be any computer hardware and/or software interface such as a web or cloud interface implemented and displayed on a display using any programming language. For example, the user interface may be a web interface that is presented to the user of the tool in a web browser using HTML5. Flow store 2304 may be any suitable storage that stores work data flows. Flow store 2304 may be any storage device and/or database(s) (as further described below). Flow processor 2306 may be any processor that may be used by the tool to perform the operations of a work data flow on any data. Processor 2306 may be one or more of any known processor, such as, but not limited to, an Intel® Itanium® or Itanium 2® processor(s), or AMD® Opteron® or Athlon MP® processor(s), or Motorola® lines of processors. Flow execution planner 2308 may be a hardware and/or a software module used to schedule and/or plan the execution of the steps involved in a work data flow that operates on any data. Query generator 2310 may be a hardware and/or software module used to take the schedule and/or plan of execution from flow execution planner 2308 and converts this schedule and/or plan into an execution (data queries and operations on the data) based on the data set(s) stored in data store(s) 2312. Data store(s) 2312 may be any suitable storage and may be any storage device and/or database(s) (as further described below). Results visualizer 2314 may be hardware and/or a software module used to visualize the outputs/results of the work data flow after query generator 2310 has operated on the data stored in data store(s). The visualizations may be one or more of the charts described with reference to FIGS. 17-22 above.

For example operations occurring during work data flow execution using the tool may include several steps. The user of the tool may request the output of a specific step in a work data flow using user interface 2302. Flow processor 2306 may look up access permissions and retrieve metadata about the work data flow from flow store 2304. Flow execution planner 2308 may determine the dependent steps required to execute user requests and may generate an execution plan (e.g., an execution plan that defines what data, from where, and what transformations are needed for the data). Query generator 2310 may convert the execution plan into an execution against the data store(s). 2312. Results visualizer 2314 may be able to collect data and generate charts to display to the user of the tool. The results visualizer 2314 may be able to display magnitudes, relations, and trends of requested data on-demand.

Figure 24:
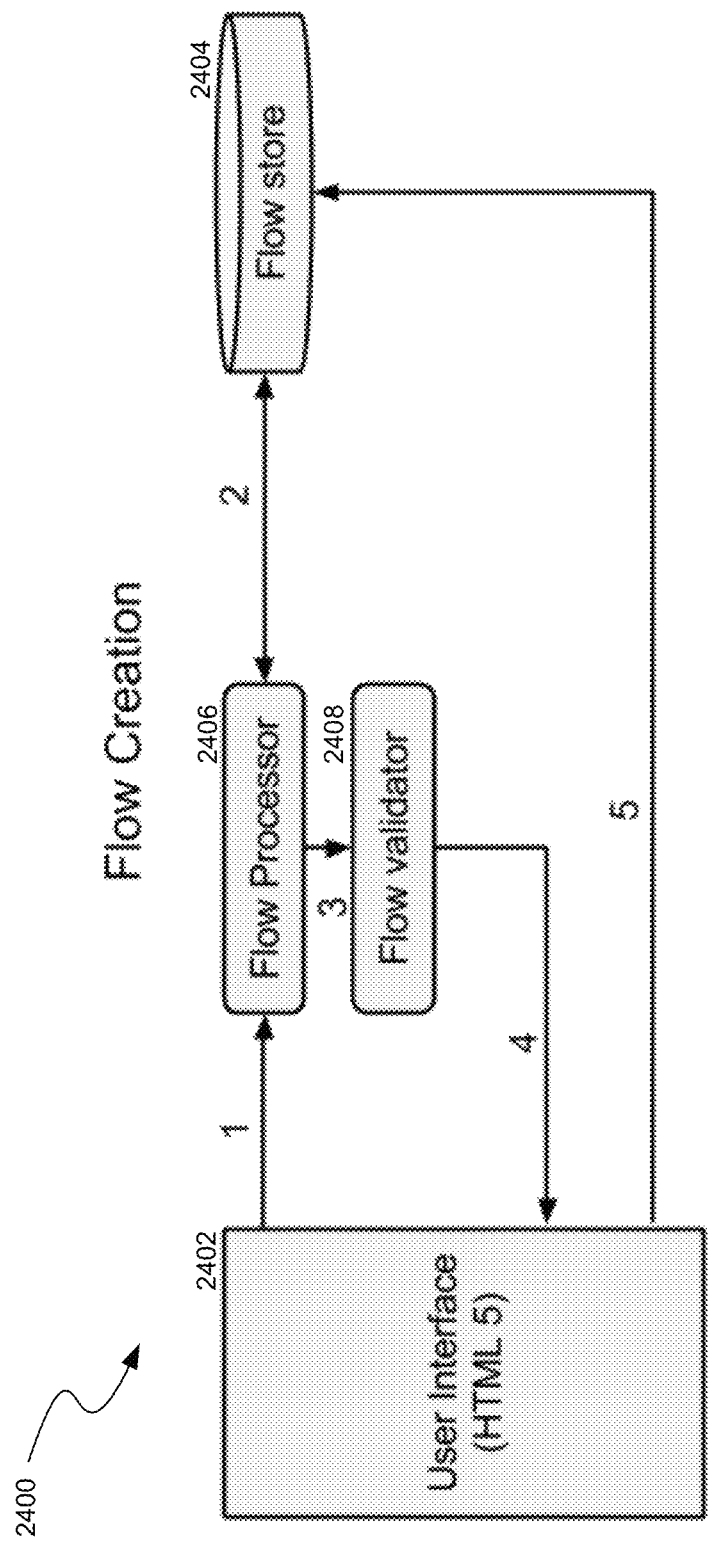
FIG. 24 illustrates a system flow diagram of operations occurring during work data flow creation using the tool in which some embodiments of the present invention may be utilized.

FIG. 24 illustrates a system flow diagram 2400 of operations occurring during work data flow creation using the tool in which some embodiments of the present invention may be utilized. System flow diagram 2400 includes user interface 2402, flow store 2404, flow processor 2406, and flow validator 2408. User interface 2402 may be any computer hardware and/or software interface such as a web or cloud interface implemented and displayed on a display using any programming language. For example, the user interface may be a web interface that is presented to the user of the tool in a web browser using HTML5. Flow store 2404 may be any suitable storage that stores work data flows. Flow store 2404 may be any storage device and/or database(s) (as further described below). Flow processor 2406 may be any processor that may be used by the tool to perform the operations of a work data flow on any data. Processor 2406 may be one or more of any known processor, such as, but not limited to, an Intel® Itanium® or Itanium 2® processor(s), or AMD® Opteron® or Athlon MP® processor(s), or Motorola® lines of processors. Flow validator 2308 may be a hardware and/or a software module used to check the dependencies of the steps involved in a work data flow that operates on any data.

For example operations occurring during work data flow creation using the tool may include several steps. The user of the tool may perform an action to create, update, or modify a work data flow using user interface 2402. Flow processor 2406 may look up access permissions and retrieve metadata about the work data flow from flow store 2404. Flow validator 2408 may check the dependencies between steps in the work data flow. For example, flow validator 2408 may be able to validate that no cyclical dependencies exist between the steps and may be able to confirm that all inputs that are needed by each step are accessible. If flow validator 2408 determines that there is an error in the dependencies in the work data flow, it may notify user interface 2402 and cause it to display an error notification to the user. A user may save a work data flow using user interface 2402 and the work data flow may be stored in flow store 2404 with any required access permissions.

Figure 25:
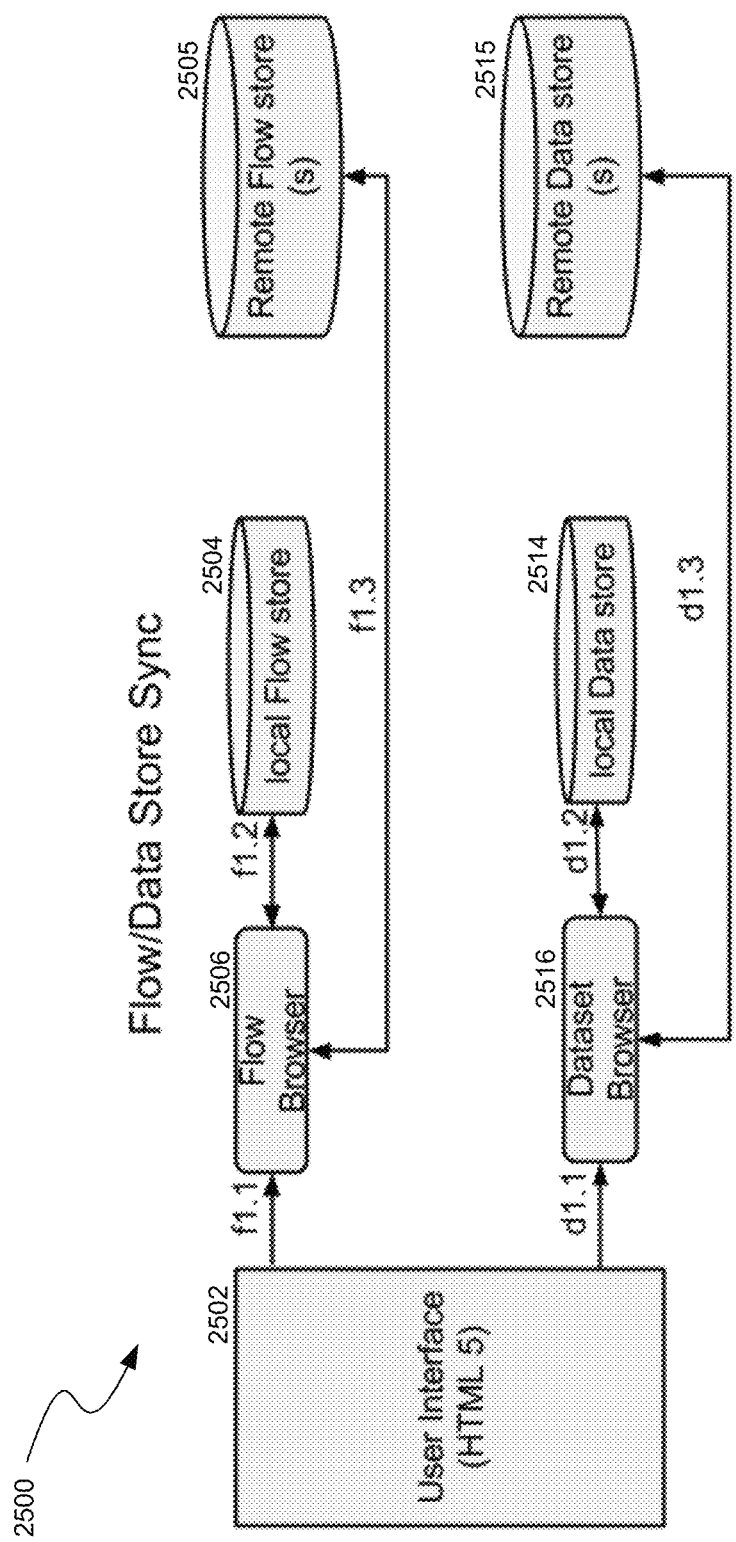
FIG. 25 illustrates a system flow diagram of operations occurring during work data flow storage and/or data storage and synchronization using the tool in which some embodiments of the present invention may be utilized.

FIG. 25 illustrates a system flow diagram 2500 of operations occurring during work data flow storage and/or data storage and synchronization using the tool in which some embodiments of the present invention may be utilized. System flow diagram 2500 includes user interface 2502, local flow store 2504, remote flow store(s) 2505, and flow browser 2506. System flow diagram 2500 also includes local data store 2514, remote data store(s) 2515, and data browser 2516. User interface 2502 may be any computer hardware and/or software interface such as a web or cloud interface implemented and displayed on a display using any programming language. For example, the user interface may be a web interface that is presented to the user of the tool in a web browser using HTML5. Local flow store 2504 may be any suitable storage that stores work data flows local to the user. Local flow store 2504 may be any storage device and/or local database(s) (as further described below). Remote flow store(s) 2505 may be any suitable storage that stores work data flows remote from the user. Remote flow store(s) 2505 may be any storage device and/or remote database(s) (as further described below). Flow browser 2506 may be a hardware and/or software module used by a user to view and/or manipulate a work data flow. Local data store 2514 may be any suitable storage that stores data and/or data sets local to the user. Local data store 2514 may be any storage device and/or local database(s) (as further described below). Remote data store(s) 2515 may be any suitable storage that stores data and/or data sets remote from the user. Remote data store(s) 2515 may be any storage device and/or remote database(s) (as further described below). Dataset browser 2516 may be a hardware and/or software module used by a user to view and/or manipulate data and/or data sets.

For example operations occurring during work data flow storage and/or data storage and synchronization using the tool may include several steps. The user of the tool may request a work data flow and/or data/datasets to be synced/saved to a server (e.g., to facilitate backup and sharing) using user interface 2502 and via work data flow browser 2506 and/or dataset browser 2516. Flow browser 2506 may access local flow store 2504 and/or remote flow store(s) 2505 to check permissions and versions and updates of a work data flow to be synced/saved. Flow browser 2506 may communicate with remote flow store(s) 2505 to sync/save the work data flow identified to be synced/saved. Dataset browser 2516 may access local data store 2514 and/or remote data store(s) 2515 to check permissions and versions and updates of data and/or data sets to be synced/saved. Dataset browser 2516 may communicate with remote data store(s) 2515 to sync/save the data and/or data sets identified to be synced/saved. The user of the tool may request a work data flow and/or data/datasets to be retrieved from a server using user interface 2502 and via work data flow browser 2506 and/or dataset browser 2516. Flow browser 2506 may access local flow store 2504 and/or remote flow store(s) 2505 to check permissions and versions and to ensure that the version of a requested work data flow are up to date. Flow browser 2506 may communicate with remote flow store(s) 2505 to retrieve the work data flow requested. Dataset browser 2516 may access local data store 2514 and/or remote data store(s) 2515 to check permissions and versions and to ensure that the version of requested data and/or data sets are up to date. Dataset browser 2516 may communicate with remote data store(s) 2515 to retrieve the data/datasets requested.

Figure 26:
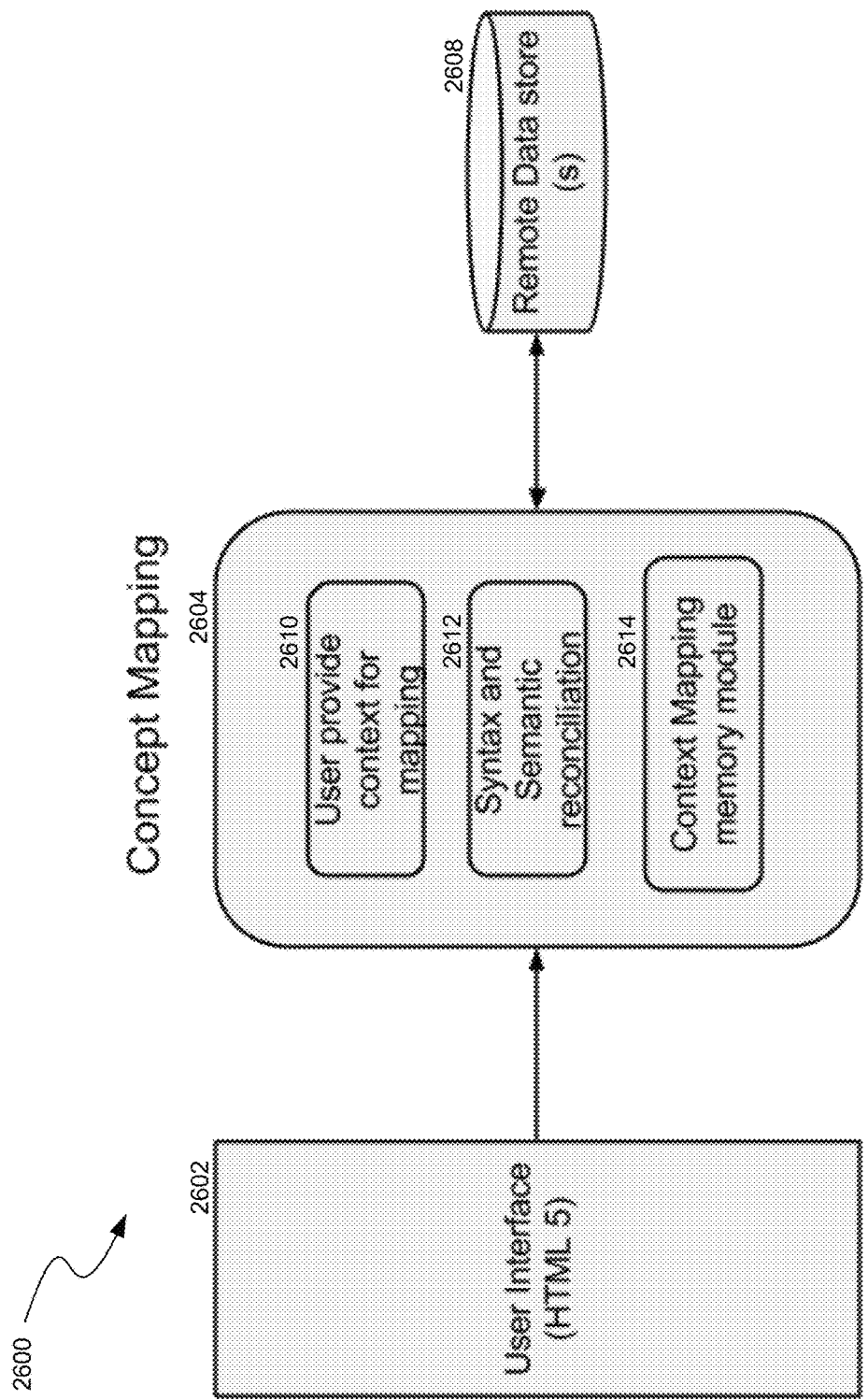
FIG. 26 illustrates a system flow diagram of operations occurring during concept mapping using the tool in which some embodiments of the present invention may be utilized.

FIG. 26 illustrates a system flow diagram 2600 of operations occurring during concept mapping using the tool in which some embodiments of the present invention may be utilized. System flow diagram 2600 includes user interface 2602, mapping module 2604, and remote data store(s) 2608. Mapping module 2604 may include user context mapping module 2610, syntax and semantic reconciliation module 2612, and context mapping memory module 2614.

For example, user interface 2602 may be a web interface that is presented to the user of the tool in a web browser using HTML5. Remote data store(s) 2608 may be any suitable storage that stores data and/or data sets remote from the user. Remote data store(s) 2608 may be any storage device and/or remote database(s) (as further described below). Mapping module 2604 may be a hardware and/or software module used by a user to map concepts to various data based on user input(s). User context mapping module 2610, syntax and semantic reconciliation module 2612, and context mapping memory module 2614 may each be a hardware and/or software module. User context mapping module 2610 may be used, e.g., by a user, to specify a particular "context" to which a data concept belongs. Syntax and semantic reconciliation module 2612 may automatically attempt to correct spelling errors such as small typos (string distance/n-grams), sounds-like corrections, and may perform language normalization. Syntax and semantic reconciliation module 2612 may automatically attempt to map labels in the data (associated with the data concepts in, e.g., a data set) to universal identifiers stored, e.g., in remote data store(s) 2608. The user may be presented the matches that result from the operation of syntax and semantic reconciliation module 2612. The user can disambiguate items based on, e.g., a confidence score associated with a particular one of the matches. The user's actions may be stored in context mapping memory module 2614 to assist in future mapping of the same data concept.

Figure 27:
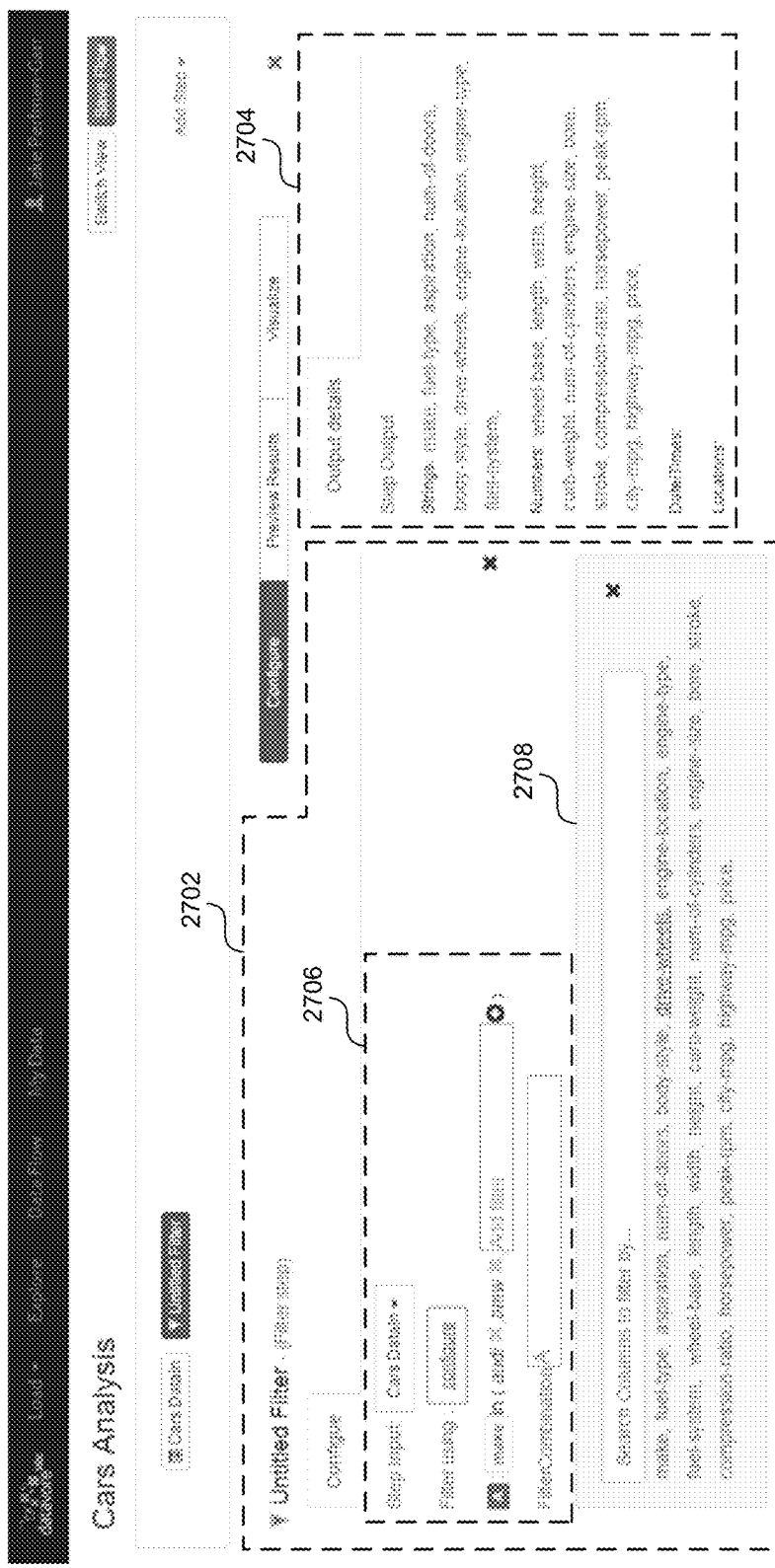
FIG. 27 illustrates an example of a filter configuration capability of the tool in which some embodiments of the present invention may be utilized.

FIG. 27 illustrates a filter configuration step in a work data flow capability of the tool in which some embodiments of the present invention may be utilized. Filter area 2702 may be used by an user to filter a data and/or data sets based on various aspects of the data. Filter configuration area 2706 included in area 2702 may allow a user to define specific portions of aspects of the data (such as, e.g., one or more fields, records, cells, or columns) as variables and may also allow the user to filter the data based on these defined variables. Filter configuration area 2706 may also be used to construct a search query for the data and/or data sets using the variables that are defined by the user. For example, a user may be able to define the variable "A" as specific items in a first column and/or field of a data set (e.g., Audi or BMW cars in the "make" column of a cars data set) and to define the variable "B" as specific items in a second column and/or field of a data set (e.g., 4-wheel drive cars in the "drive-wheels" column of a cars data set). The user may then filter the data set based on the aspect of the data associated with the variable(s) defined (e.g., using Boolean operators). For example, the user can choose to filter the data set based on all data related to variable "A" (e.g., Audi or BMW cars in the "make" column of a cars data set) by inputting "A" into filter configuration area 2706. As another example, the user can choose to filter the data set based on all data related to the Boolean "AND" of variables "A" and "B" (e.g., Audi or BMW cars in the "make" column and 4-wheel drive cars in the "drive-wheels" column of a cars data set) by inputting "A AND B" into filter configuration area 2706. As yet another example, the user can choose to filter the data set based on all data related to the Boolean "OR" of variables "NOT(A)" and "B" (e.g., not Audi or BMW cars in the "make" column or 4-wheel drive cars in the "drive-wheels" column of a cars data set) by inputting "NOT(A) OR B" into filter configuration area 2706. Filter area 2702 may also include search area 2708 that may be used by a user to search for particular aspects of the data (such as, e.g., one or more fields, records, cells, or columns). For example, a user may search for these aspects of data when the user is defining the variables in configuration area 2706. Output details area 2704 may be able to provide an area for users to select or define particular aspects of the filtered data results (e.g., particular fields and/or columns) for output. For example, the "make," and "highway-mpg" of the filtered cars data may selected or defined for output.

Figure 28:
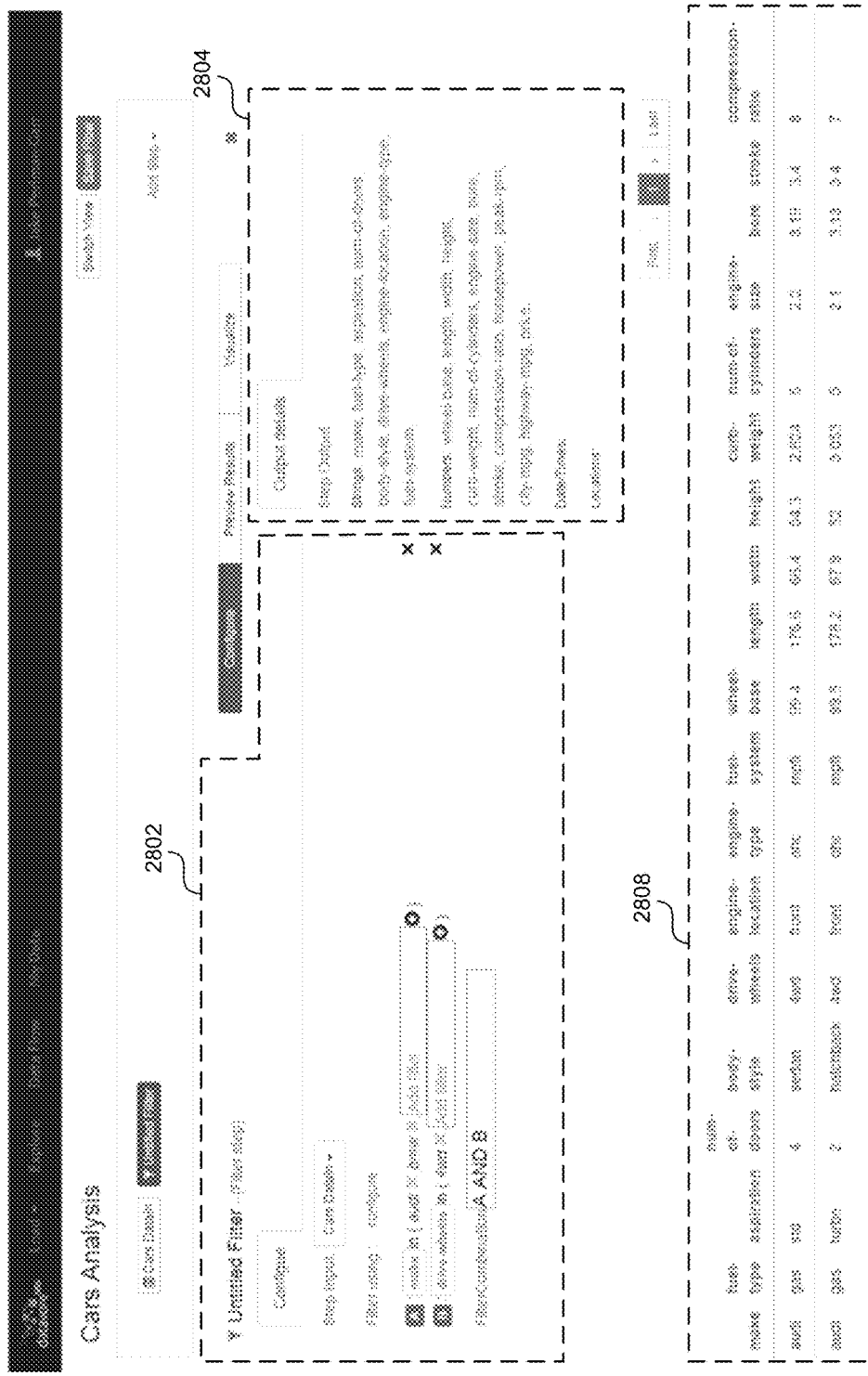
FIG. 28 illustrates an example of a first filter capability of the tool in which some embodiments of the present invention may be utilized.

FIG. 28 illustrates a first example of a filter step in a work data flow capability of the tool in which some embodiments of the present invention may be utilized. Filter area 2802 may be used by an user to filter a data and/or data sets based on various aspects of the data. Filter area 2802 may allow a user to define specific portions of aspects of the data (such as, e.g., one or more fields, records, cells, or columns) as variables and may also allow the user to filter the data based on these defined variables. For example, the variable "A" may be defined as specific items in a first column and/or field of a data set (e.g., Audi or BMW cars in the "make" column of a cars data set) and variable "B" may be defined as specific items in a second column and/or field of a data set (e.g., 4-wheel drive cars in the "drive-wheels" column of a cars data set). The user may then filter the data set based on the aspect of the data associated with the variable(s) defined. As another example, the user can choose to filter the data set based on all data related to the Boolean "AND" of variables "A" and "B" (e.g., Audi or BMW cars in the "make" column and 4-wheel drive cars in the "drive-wheels" column of a cars data set) by inputting "A AND B" into filter area 2802. Output details area 2804 may be able to provide an area for users to select or define particular aspects of the filtered data results (e.g., particular fields and/or columns) for output. For example, the "make," and "highway-mpg" of the filtered cars data may selected or defined for output. Results area 2808 may display the results of the filtered data and show the aspects of the filtered data selected or defined in output details area 2804. For example, results area 2808 may show the "make," and "highway-mpg" of the filtered cars data (e.g. the "make" and "highway-mpg" of cars corresponding to Audi or BMW cars in the "make" column and 4-wheel drive cars in the "drive-wheels" column of a cars data set).

Figure 29:
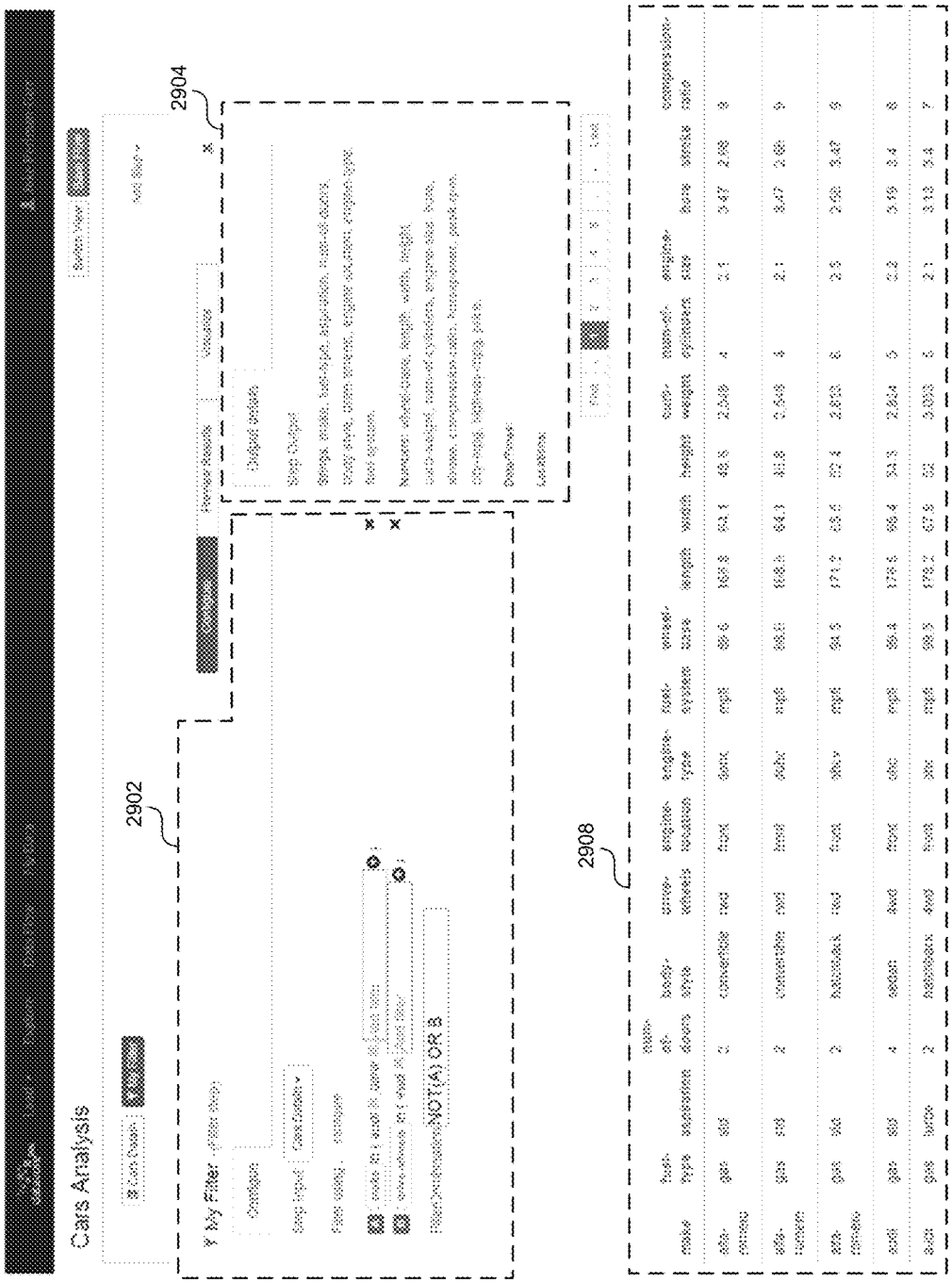
FIG. 29 illustrates an example of a second filter capability of the tool in which some embodiments of the present invention may be utilized.

FIG. 29 illustrates a second example of a filter step in a work data flow capability of the tool in which some embodiments of the present invention may be utilized. Filter area 2902 may be used by an user to filter a data and/or data sets based on various aspects of the data. Filter area 2902 may allow a user to define specific portions of aspects of the data (such as, e.g., one or more fields, records, cells, or columns) as variables and may also allow the user to filter the data based on these defined variables. For example, the variable "A" may be defined as specific items in a first column and/or field of a data set (e.g., Audi or BMW cars in the "make" column of a cars data set) and variable "B" may be defined as specific items in a second column and/or field of a data set (e.g., 4-wheel drive cars in the "drive-wheels" column of a cars data set). The user may then filter the data set based on the aspect of the data associated with the variable(s) defined. As another example, the user can choose to filter the data set based on all data related to the Boolean "OR" of variables "NOT(A)" and "B" (e.g., not Audi or BMW cars in the "make" column or 4-wheel drive cars in the "drive-wheels" column of a cars data set) by inputting "NOT(A) OR B" into filter area 2902. Output details area 2904 may be able to provide an area for users to select or define particular aspects of the filtered data results (e.g., particular fields and/or columns) for output. For example, the "make," and "highway-mpg" of the filtered cars data may selected or defined for output. Results area 2908 may display the results of the filtered data and show the aspects of the filtered data selected or defined in output details area 2904. For example, results area 2908 may show the "make," and "highway-mpg" of the filtered cars data (e.g. the "make" and "highway-mpg" of cars not corresponding to Audi or BMW cars in the "make" column or 4-wheel drive cars in the "drive-wheels" column of a cars data set).

In the present disclosure, various data ingestion and concept mapping steps, data reconciliation steps, the steps in any data work flow and/or data analysis, and steps in visualization (e.g., the display of any charts) may be automatically performed (e.g., as discussed above) by the tool. In performing a step, the tool may "learn" concepts and use what it learns in the performance of other steps or within the same step. The automation of various steps and the "learning" of concepts may be performed using any known machine learning techniques and/or artificial intelligence techniques. In addition, the generation of visualizations (e.g., charts), described in the present disclosure, may be automatic and may be based on user selected concepts and variables. Unlike traditional systems, generation of such visualizations by the tool may require minimal or no input from a user of the tool.

Figure 30:
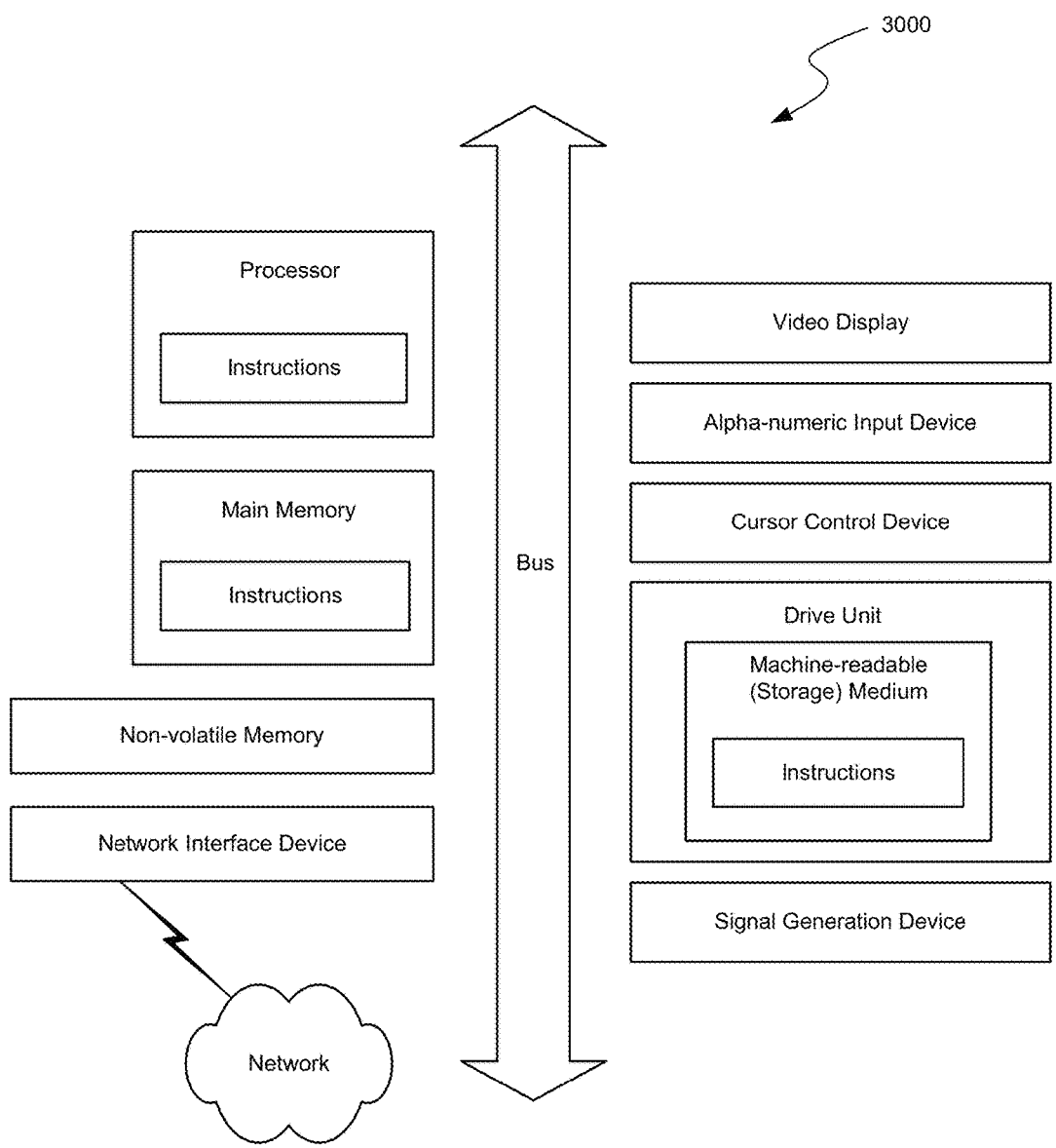
FIG. 30 illustrates an example of a computer system with which some embodiments of the present invention may be utilized.

FIG. 30 shows a diagrammatic representation of a machine in the example form of a computer system within which a set of instructions, for causing the machine to perform any one or more of the methodologies, functionalities, and the tool described herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the steps, routines, modules, and/or operations executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure. The processor(s) described herein can be any known processor(s), such as, but not limited to, an Intel® Itanium® or Itanium 2® processor(s), or AMD® Opteron® or Athlon MP® processor(s), or Motorola® lines of processors.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media (collectively "storage" herein) include, but are not limited to, recordable type media such as volatile and non-volatile memory devices, external storage devices or databases accessed via, e.g., the network interface device, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 3000 to mediate data in a network with an external entity, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater. As examples, the network interface device can be any of an RS-232 port for use with a modem based dialup connection, a 10/100 Ethernet port, or a Gigabit port using copper or fiber. The network interface device may be chosen depending on a network such a Local Area Network (LAN), Wide Area Network (WAN), or any network to which the machine 3000 connects.

The network interface device can include a firewall which can, in some embodiments, govern and/or manage permission to access/proxy data in a computer network and/or networked databases, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Embodiments of the present invention include various steps, routines, modules, and/or operations, which have been described above. A variety of these steps, routines, modules, and/or operations may be performed by hardware components or may be embodied in machine-executable instructions, which may be used to cause a general-purpose or special-purpose processor programmed with the instructions to perform the operations/steps/modules. Alternatively, the operations/steps/modules may be performed by a combination of hardware, software, and/or firmware. As such, FIG. 30 is an example of a machine/computer system with which embodiments of the present invention may be utilized.

The components described above are meant to exemplify some types of possibilities. In no way should the aforementioned examples limit the scope of the invention, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity (e.g., a user's machine/computer) to another (e.g., server(s) on which database(s) are hosted). In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

While detailed descriptions of one or more embodiments of the invention of the tool and/or platform (e.g., named Datavore) have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method for processing data, the method comprising:
   aggregating, on a local device, multiple sources of raw data, residing on a data storage, to produce aggregated data;
   learning, using the local device, a concept existent between the aggregated data within the multiple sources of raw data using concept mapping techniques;
   analyzing the concept and the aggregated data using data manipulation and statistical techniques to produce output data;
   capturing the work data flow of the data during the analyzing of the learned and reconciled data;
   storing, on a flow storage, a work data flow as the aggregated data is analyzed; and
   validating that the stored work data flow does not include a cyclical dependency, using a flow validator.

2. The method of claim 1, wherein if the cyclical dependency is found, an error notification is generated on a display of the local device.

3. The method for claim 1, further comprising:
   validating that the stored work flow has access to all needed inputs using a flow validator.

4. The method of claim 1, wherein access permissions are set when the work data flow is stored.

5. The method of claim 1, wherein the data storage and the flow storage are each on the local device.

6. The method of claim 1, wherein the concept mapping techniques include using a syntax and semantic reconciliation module to automatically correct errors in the data.

7. The method of claim 1, wherein the concept mapping techniques include using a syntax and semantic reconciliation module to automatically map labels to the aggregated data.

8. The method of claim 7, wherein the syntax and semantic reconciliation module automatically maps labels to the aggregated data based on a confidence score.

9. The method of claim 1, further comprising generating, for display on a display of the local device, a visualization of the output data.

10. The method of claim 9, wherein the output data may be filtered by selecting an area on the visualization.

11. A system for processing data, the system comprising:
    a data storage;
    a flow storage; and
    a local device with a display configured to:
      aggregate multiple sources of raw data, residing on the data storage to produce aggregated data;
      learn a concept existent between the aggregated data within the multiple sources of raw data using concept mapping techniques;
      analyze the concept and the aggregated data using data manipulation and statistical techniques to produce output data;
      capture the work data flow of the data during the analyzing of the learned and reconciled aggregated data;
      store, on the flow storage, a work data flow as the aggregated data is analyzed; and
      validate that the stored work data flow does not include a cyclical dependency, using a flow validator.

12. The system of claim 11, wherein if the cyclical dependency is found, an error notification is generated on the display.

13. The system of claim 11, wherein the local device with the display is configured to:
    validate that the stored work flow has access to all needed inputs using a flow validator module.

14. The system of claim 11, wherein access permissions are set when the work data flow is stored.

15. The system of claim 11, wherein the data storage and the flow storage are each on the local device.

16. The system of claim 11, wherein the concept mapping techniques include using a syntax and semantic reconciliation module to automatically correct errors in the aggregated data.

17. A non-transitory machine readable storage medium encoded with instructions for performing a method for processing data, the instructions comprising:
    instructions to aggregate, on a local device, multiple sources of raw data, residing on a data storage, to produce aggregated data;
    instructions to learn, using the local device, a concept existent between the aggregated data within the multiple sources of raw data using concept mapping techniques;
    instructions to analyze the concept and the aggregated data using data manipulation and statistical techniques to produce output data;
    instructions to capture the work data flow of the data during the analyzing of the learned and reconciled data;

instructions to store, on a flow storage, a work data flow as the aggregated data is analyzed; and instructions to validate that the stored work data flow does not include a cyclical dependency, using a flow validator.

18. The medium of claim 17, wherein if the cyclical dependency is found, an error notification is generated on a display of the local device.

19. The medium of claim 17, the instructions further comprising:

instructions to validate that the stored work flow has access to all needed inputs using a flow validator.

20. The medium of claim 17, wherein access permissions are set when the work data flow is stored.

* * * * *